United States Patent
Ogiwara et al.

(10) Patent No.: US 9,191,145 B2
(45) Date of Patent: Nov. 17, 2015

(54) COMMUNICATIONS APPARATUS, MULTIPLEX COMMUNICATIONS APPARATUS, COMMUNICATIONS SYSTEM, AND COMMUNICATION METHOD

(75) Inventors: Hiroshi Ogiwara, Kawasaki (JP); Tsutomu Aiba, Kawasaki (JP); Shigeru Ono, Kanagawa (JP); Kouichi Ogihara, Kanagawa (JP)

(73) Assignees: FUJITSU LIMITED, Kawasaki (JP); NTT ELECTRONICS CORPORATION, Yokohama (JP)

( * ) Notice: Subject to any disclaimer, the term of this patent is extended or adjusted under 35 U.S.C. 154(b) by 848 days.

(21) Appl. No.: 13/317,646

(22) Filed: Oct. 25, 2011

(65) Prior Publication Data

US 2012/0106969 A1    May 3, 2012

(30) Foreign Application Priority Data

Oct. 29, 2010   (JP) ................. 2010-243240

(51) Int. Cl.
*H04B 10/079* (2013.01)
*H04B 10/516* (2013.01)
*H04J 14/02* (2006.01)
*H04B 10/572* (2013.01)
*H04J 14/06* (2006.01)

(52) U.S. Cl.
CPC ...... *H04J 14/0279* (2013.01); *H04B 10/07957* (2013.01); *H04B 10/572* (2013.01); *H04B 10/516* (2013.01); *H04J 14/0273* (2013.01); *H04J 14/06* (2013.01)

(58) Field of Classification Search
CPC ............... H04B 10/07957; H04B 10/0799; H04B 10/2503; H04B 10/2507
See application file for complete search history.

(56) References Cited

U.S. PATENT DOCUMENTS

| 4,755,993 A | * | 7/1988 | Grover ........................ 370/505 |
| 5,999,291 A | * | 12/1999 | Anderson .................... 398/91 |
| 2003/0058509 A1 | * | 3/2003 | Webb et al. ................. 359/187 |

FOREIGN PATENT DOCUMENTS

| JP | 2007-181194 | 7/2007 |
| JP | 2009-213160 | 9/2009 |
| JP | 2010-028470 | 2/2010 |

OTHER PUBLICATIONS

Japanese Office Action mailed Apr. 8, 2014 in corresponding Japanese Patent Application No. 2010-243240.

* cited by examiner

*Primary Examiner* — Darren E Wolf
(74) *Attorney, Agent, or Firm* — Staas & Halsey LLP

(57) ABSTRACT

A communications apparatus includes a transmitter that transmits signal light that is wavelength division multiplexed with other signal light and that is to be transmitted to an opposing apparatus, and a processor that is operative to change a frequency of the signal light to be transmitted by the transmitter based on detection results at the opposing apparatus and concerning variation in the frequency of the transmitted signal light.

14 Claims, 24 Drawing Sheets

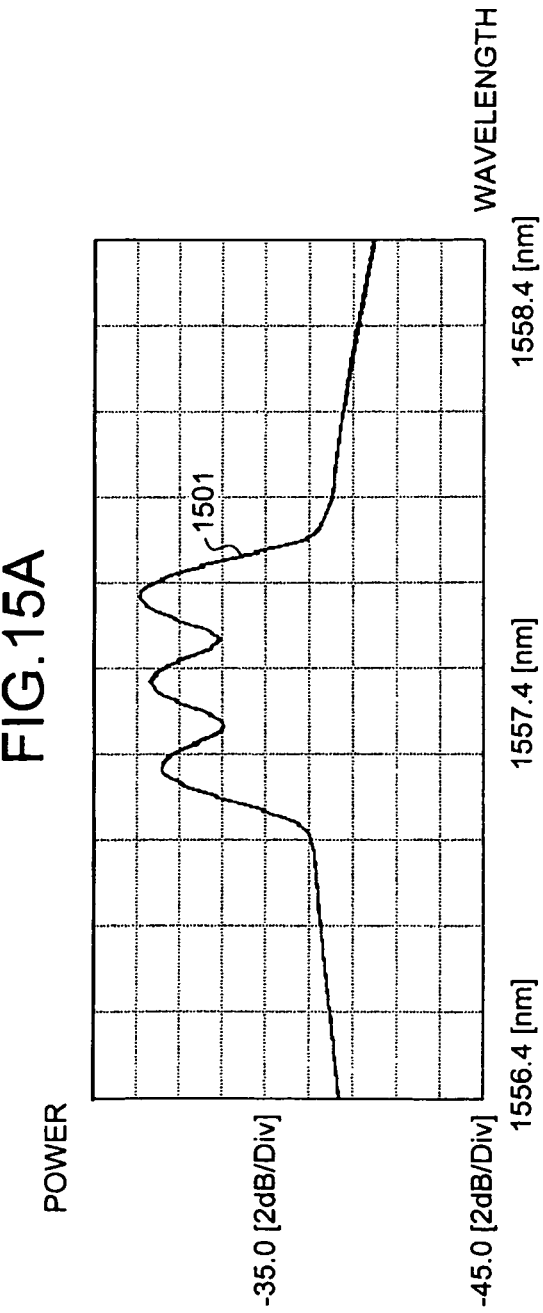

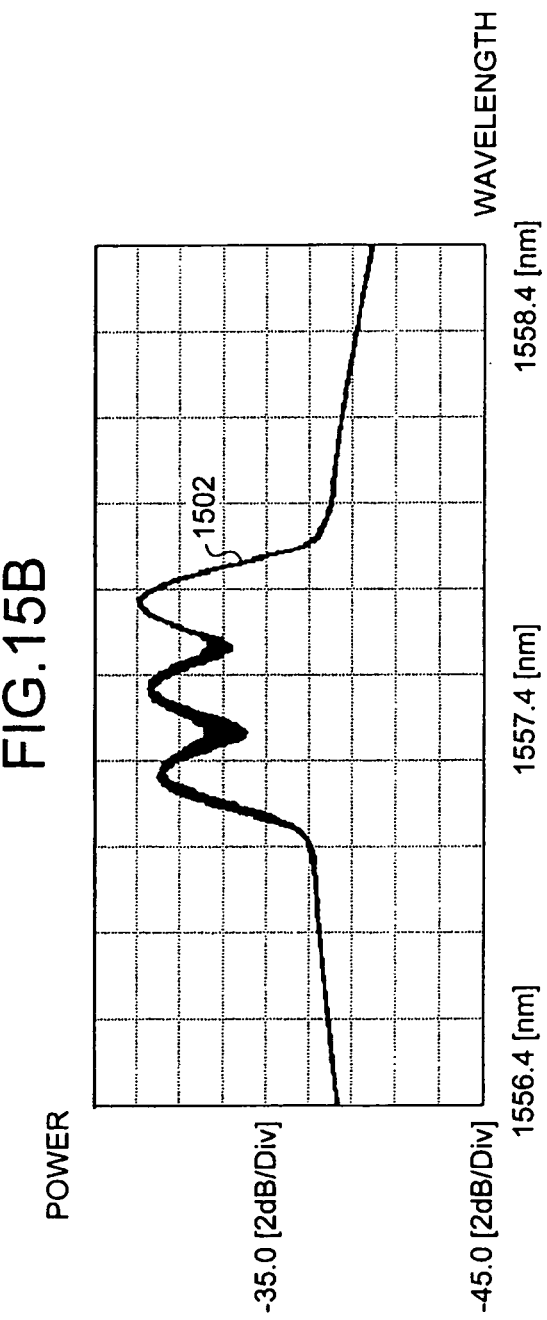

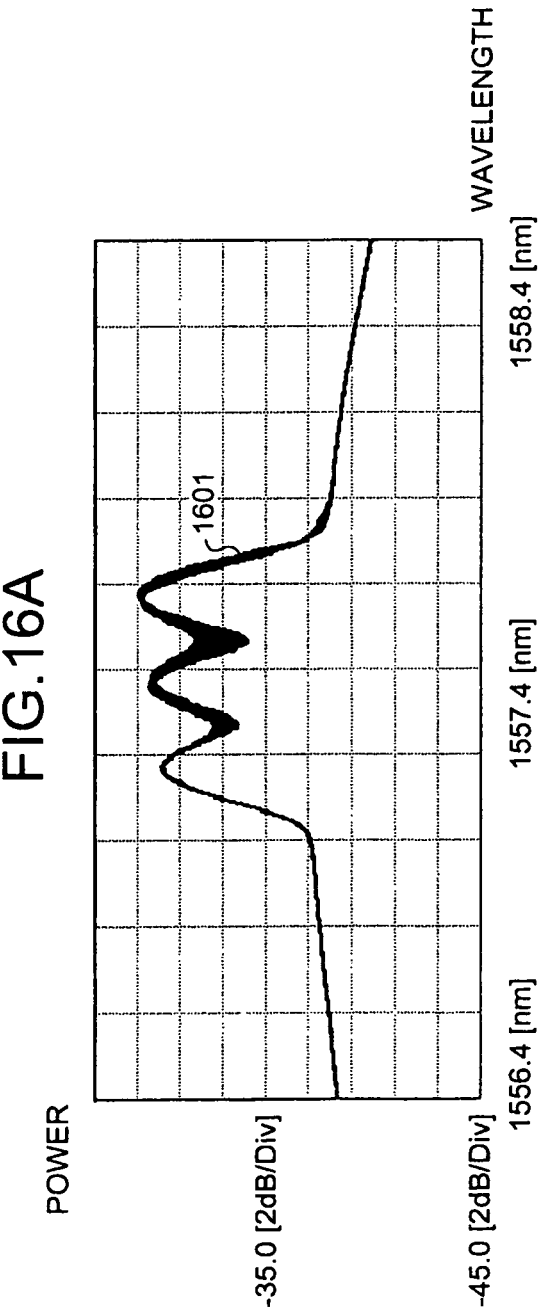

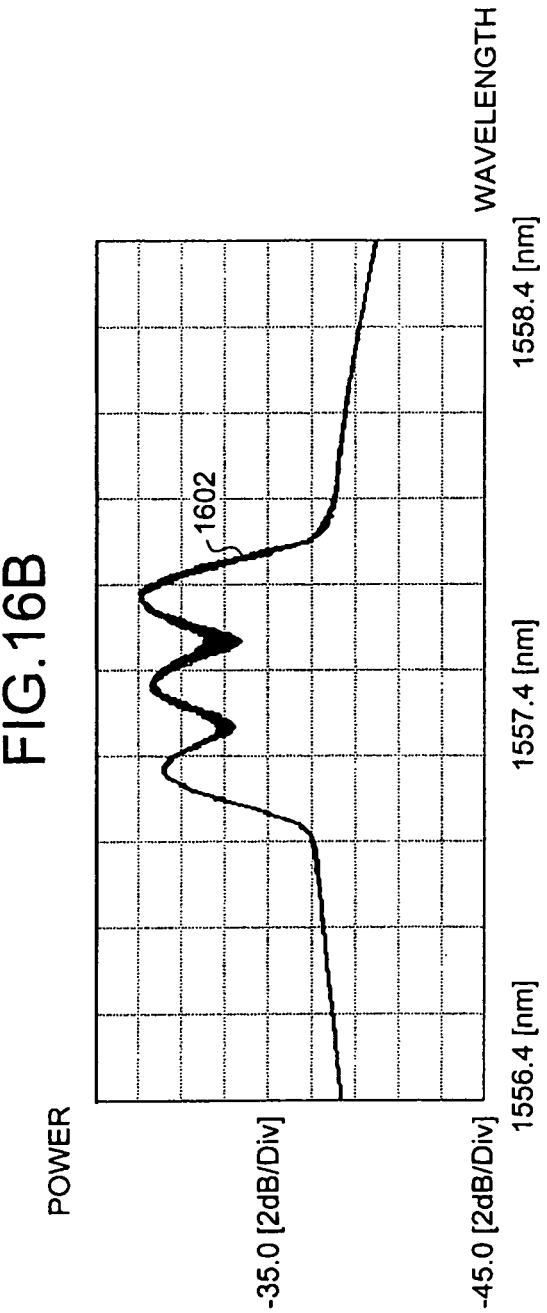

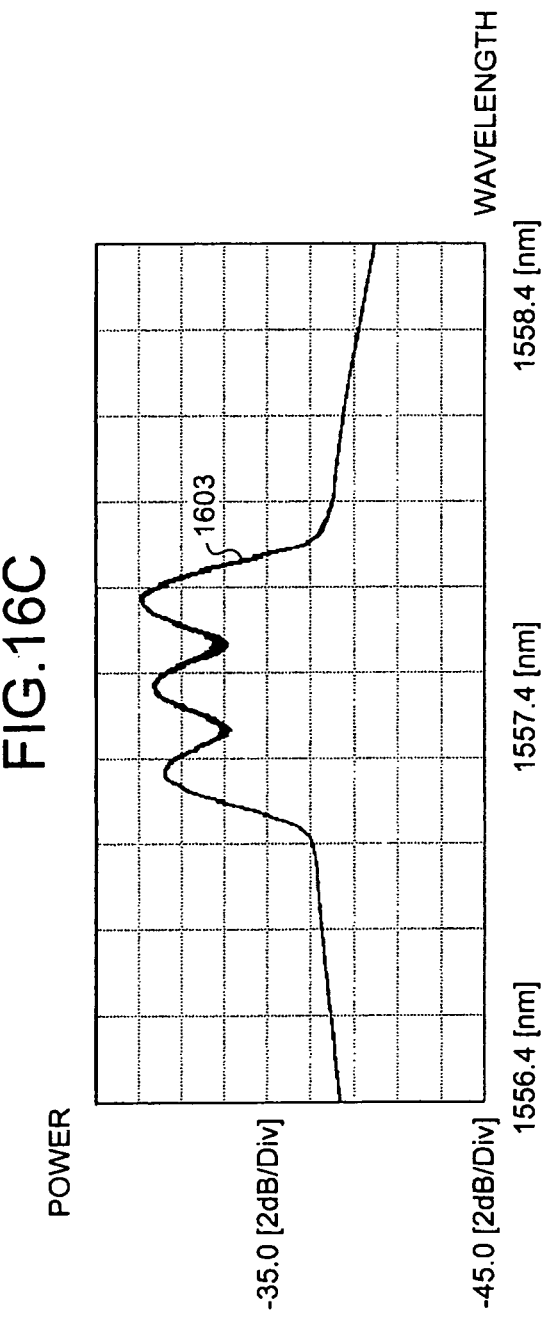

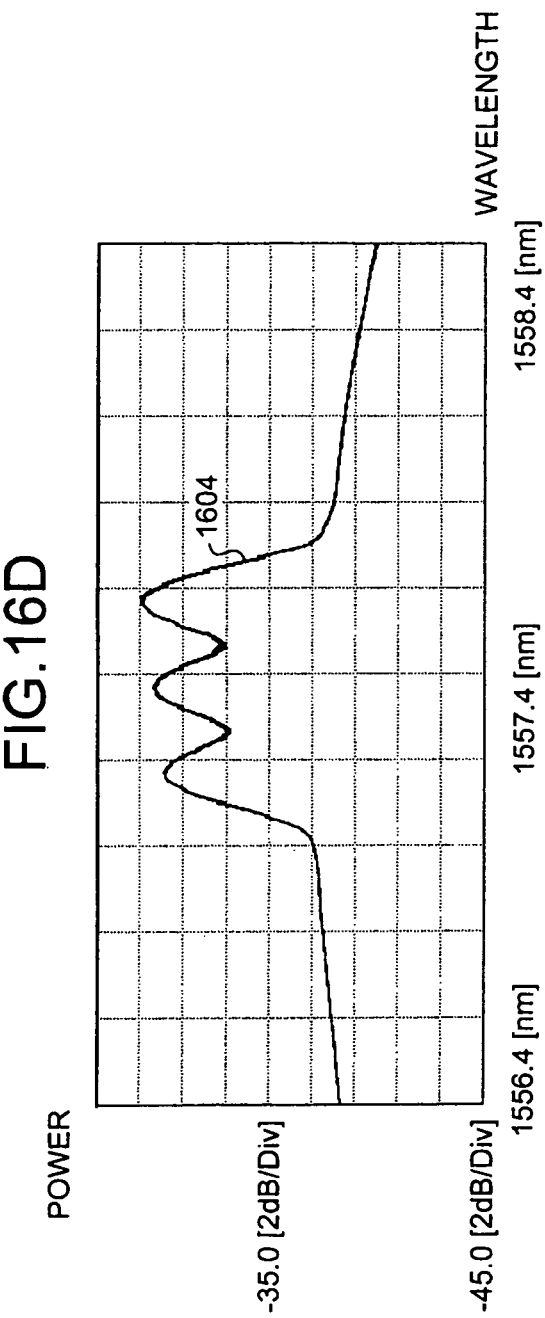

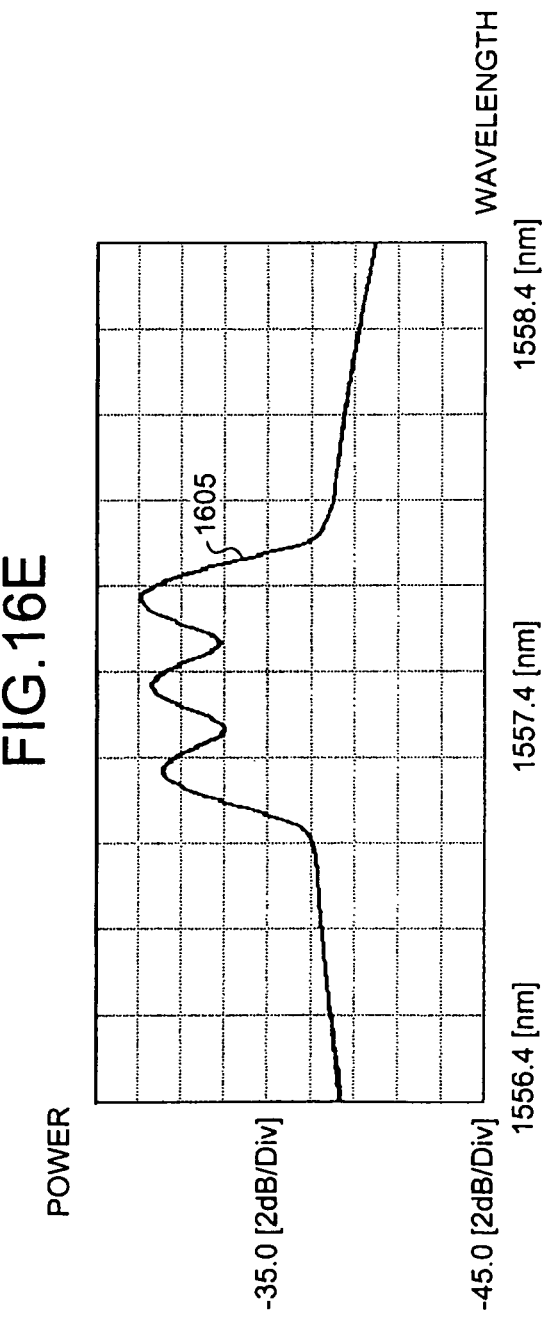

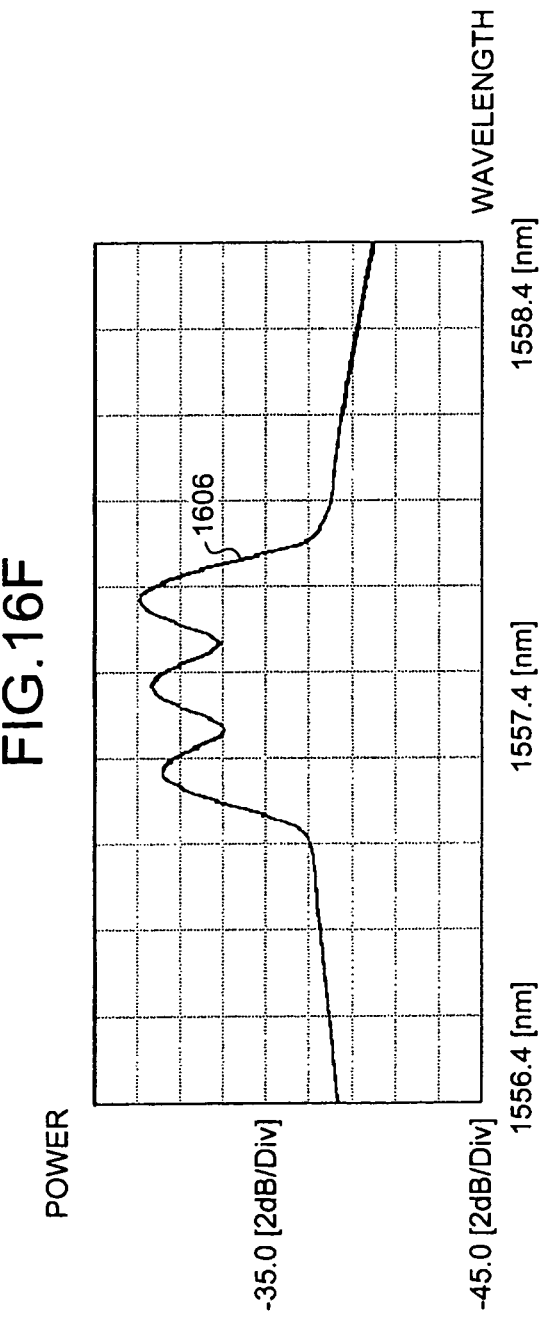

COMMUNICATIONS APPARATUS, MULTIPLEX COMMUNICATIONS APPARATUS, COMMUNICATIONS SYSTEM, AND COMMUNICATION METHOD

CROSS REFERENCE TO RELATED APPLICATIONS

This application is based upon and claims the benefit of priority of the prior Japanese Patent Application No. 2010-243240, filed on Oct. 29, 2010, the entire contents of which are incorporated herein by reference.

FIELD

The embodiments discussed herein are related to a communications apparatus, a multiplex communications apparatus, a communications system, and a communication method.

BACKGROUND

Recently, in optical communications systems, the use of signals subjected to phase modulation, which is excellent for reception sensitivity, to perform wavelength division multiplexing (WDM) with high density at a narrow wavelength interval is raising demand for increases in transmission capacity. Phase modulation schemes include differential phase shift keying (DPSK) and differential quadrature PSK.

In optical fibers having nonlinear effects, signal light transmitted by wavelength division multiplexing is affected by cross phase modulation from the signal light of an adjacent wavelength channel (see, for example, Japanese Laid-Open Patent Publication No. 2010-028470). The effects of cross phase modulation become large due to raised output of transmission path input power, increases in transmission distance and relaying, narrowing of the wavelength intervals among adjacent wavelengths.

Further, when phase modulated signal light is affected by cross phase modulation and the wavelength varies, since the demodulation accuracy at the receiving side drops, communication quality also drops. In particular, for high density multiplexing systems that densely multiplex wavelength intervals to increase frequency utilization efficiency, since frequency variations caused by cross phase modulation is great, drops in the quality of communication via phase modulated signal light are also great. Further, technology is known that reduces the effect of cross phase modulation, by flattening the waveform of signal light to be multiplexed (see, for example, Japanese Laid-Open Patent Publication No. 2009-213160).

However, the effect of cross phase modulation varies according to the power and wavelength interval states of the signal light to be wavelength division multiplexed. Consequently, problems arise with the conventional technologies above in that an appropriate reduction of the effect of the cross phase modulation is difficult and communication quality cannot be improved.

SUMMARY

According to an aspect of an embodiment, a communications apparatus includes a transmitter that transmits signal light that is wavelength division multiplexed with other signal light and that is to be transmitted to an opposing apparatus, and a processor that is operative to change a frequency of the signal light to be transmitted by the transmitter based on detection results at the opposing apparatus and concerning variation in the frequency of the transmitted signal light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15A is a diagram depicting the spectrum (weak nonlinear effect) of the signal light after transmission.

FIG. 15B is a diagram depicting the spectrum (strong nonlinear effect) of the signal light after transmission.

FIGS. 16A, 16B, 16C, 16D, 16E, and 16F are diagrams depicting the spectra (after transmission) of signal light differing in frequency between adjacent channels.

DESCRIPTION OF EMBODIMENTS

Preferred embodiments of the present invention will be explained with reference to the accompanying drawings.

Figure 1:
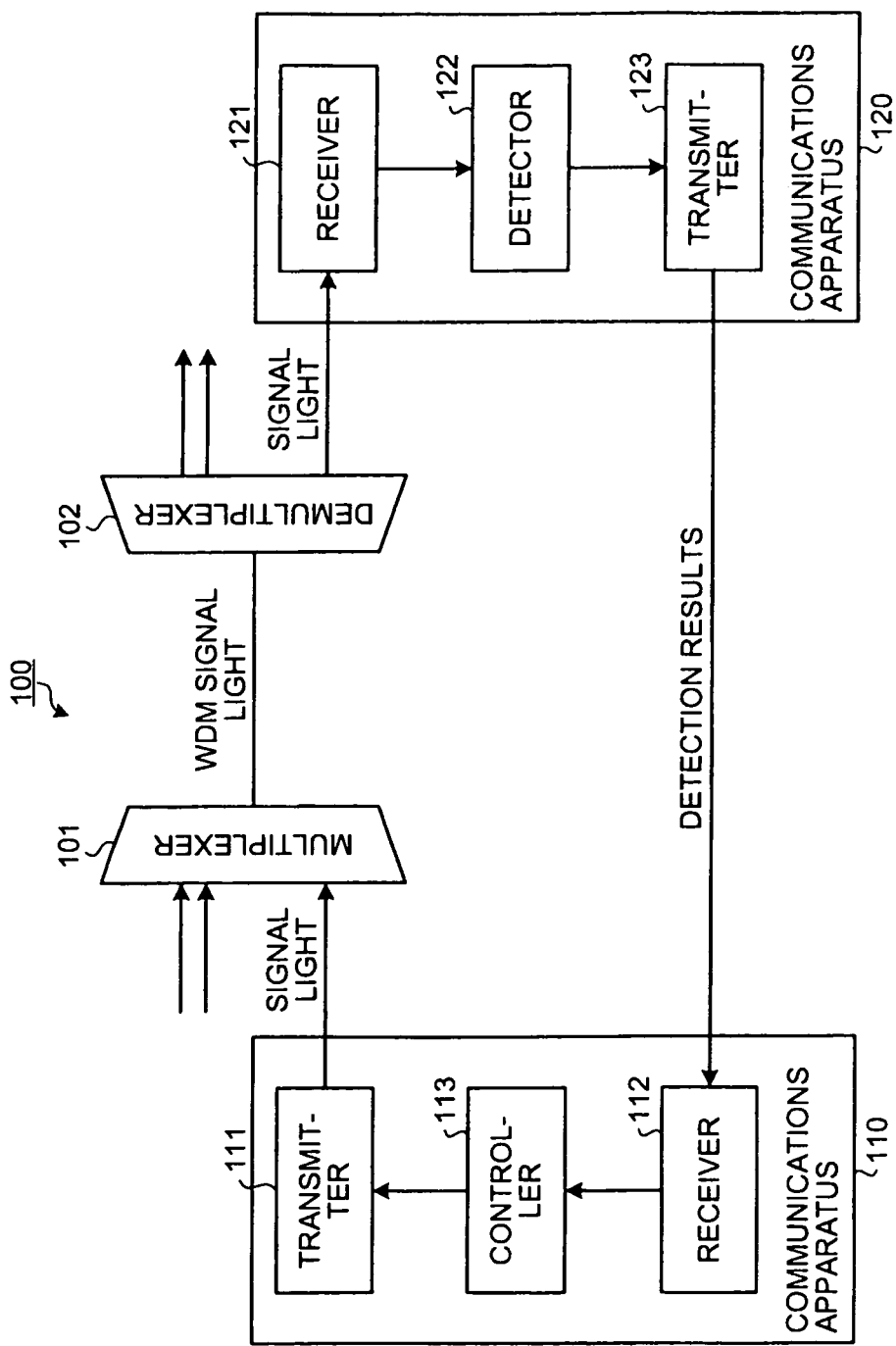
FIG. 1 is a diagram depicting a communications system according to a first embodiment.

FIG. 1 is a diagram depicting a communications system according to a first embodiment. As depicted in FIG. 1, a communications system 100 according to the first embodiment includes a multiplexer 101, a demultiplexer 102, and communications apparatuses 110, 120. The multiplexer 101 and the demultiplexer 102 achieve wavelength division multiplexing of signal light output from the communications apparatus 110 (first communications apparatus) with other signal light, and transmits the multiplexed signal light to the communications apparatus 120 (second communications apparatus).

For example, based on wavelength, the multiplexer 101 combines the signal light output from the communications apparatus 110 with other signal light to perform wavelength division multiplexing. The multiplexer 101 transmits the wavelength division multiplexed WDM signal light to the demultiplexer 102. The demultiplexer 102 splits, based on wavelength, the WDM signal light transmitted from the multiplexer 101 to perform wavelength demultiplexing. The demultiplexer 102 transmits to the communications apparatus 120, the demultiplexed signal light that is from the communications apparatus 110.

The communications apparatus 110 includes a transmitter 111, a receiver 112, and a controller 113. The transmitter 111 transmits the signal light to the multiplexer 101. Consequently, the signal light from the transmitter 111 is wavelength division multiplexed with other light and transmitted to the communications apparatus 120 (opposing apparatus). The modulation scheme of the signal light transmitted by the transmitter 111 is, for example, DPSK, RZ(Return to Zero)-DPSK, NRZ(Non RZ)-DPSK, DQPSK, RZ-DQPSK, NRZ-DQPSK, or a combination of these modulating schemes and polarization multiplexing.

The receiver 112 receives detection results transmitted by the communications apparatus 120 (opposing apparatus). The detection results are detection results at the communications apparatus 120, indicating variation of the frequency of the signal light transmitted from the transmitter 111. The receiver 112 outputs the received detection results to the controller 113.

The controller 113, based on the detection results output from the receiver 112, changes the frequency (transmission speed) of the signal light transmitted from the transmitter 111. For example, the controller 113 changes, from an initial value, the frequency of the signal light transmitted from the transmitter 111, so that the variation in frequency indicated by the detection results becomes less than a given magnitude.

The communications apparatus 120 is an opposing apparatus of the communications apparatus 110. The communications apparatus 120 includes a receiver 121, a detector 122, and a transmitter 123. The receiver 121 receives the signal light that has been transmitted from the communications apparatus 110 and wavelength division multiplexed and demultiplexed by the multiplexer 101 and the demultiplexer 102. The receiver 121 transmits the received signal to the detector 122.

The detector 122 detects variation of the frequency of the signal output from the receiver 121. Detection of variation of the frequency, for example, is a detection of the magnitude of the variation, a detection of variations that exceed a given magnitude, etc. The detector 122 outputs to the transmitter 123, detection results concerning frequency variation. The transmitter 123 transmits to the communications apparatus 110, the detection results output from the detector 122. The transmission of the detection results by the transmitter 123 may be by optical communication employing wavelength division multiplexing, by electronic communication, etc.

Figure 2:
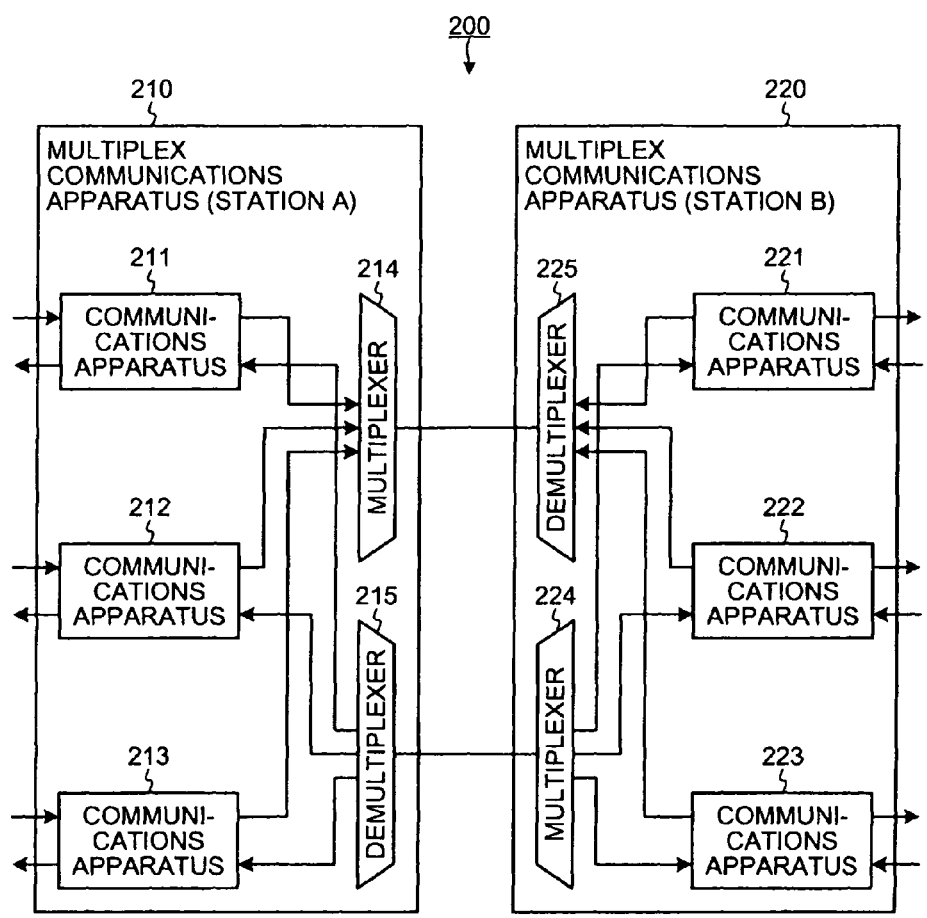
FIG. 2 is a diagram depicting an example of the communications system.

FIG. 2 is a diagram depicting an example of the communications system. A communications system 200 depicted in FIG. 2, is an example of the communications system 100 depicted in FIG. 1. In the communications system 200, for example, synchronous digital hierarchy (SDH) is applied. The communications system 200 includes a multiplex communications apparatus 210 and a multiplex communications apparatus 220. The multiplex communications apparatus 210 is regarded as station A, while the multiplex communications apparatus 220 is regarded as station B.

The multiplex communications apparatus 210 includes communications apparatuses 211 to 213, a multiplexer 214, and a demultiplexer 215. The communications apparatuses 211 to 213, respectively, are repeater apparatuses that receive signal light transmitted from other communications apparatuses that are not depicted and transmit the received signal light to the multiplexer 214. The wavelengths of the signal light transmitted by the communications apparatuses 211 to 213 are regarded as wavelengths $\lambda 11$ to $\lambda 13$, respectively.

The wavelengths $\lambda 11$ to $\lambda 13$, for example, have a relationship of $\lambda 11 < \lambda 12 < \lambda 13$ and a frequency interval of, for example, 25 [GHz], 33.3 [GHz] or 37.5 [GHz]. Further, the communications apparatuses 211 to 213, respectively, are repeater apparatuses that receive signal light transmitted from the demultiplexer 215 and transmit the received signal light to other communications apparatuses that are not depicted.

The multiplexer 214 combines the signal light of wavelengths $\lambda 11$ to $\lambda 13$ respectively from the communications apparatuses 211 to 213 to perform wavelength division multiplexing. The multiplexer 214 transmits the wavelength division multiplexed WDM signal light to the multiplex communications apparatus 220. The demultiplexer 215 splits the WDM signal light transmitted from the multiplex communications apparatus 220 to perform wavelength demultiplexing. The demultiplexer 215 outputs the demultiplexed signal light of wavelengths $\lambda 21$ to $\lambda 23$ to the communications apparatuses 211 to 213, respectively.

The multiplex communications apparatus 220 includes communications apparatuses 221 to 223, a multiplexer 224, and a demultiplexer 225. The communications apparatuses 221 to 223, respectively, are repeater apparatuses that receive signal light transmitted from other communications apparatuses that are not depicted and transmit the received signal light to the multiplexer 224. The wavelengths of the signal light transmitted by the communications apparatuses 221 to 223 are regarded as wavelengths $\lambda 21$ to $\lambda 23$, respectively.

The wavelengths $\lambda 21$ to $\lambda 23$, for example, have a relationship of $\lambda 21 < \lambda 22 < \lambda 23$ and a frequency interval of, for example, 25 [GHz], 33.3 [GHz] or 37.5 [GHz]. Further, the communications apparatuses 221 to 223, respectively, are repeater apparatuses that receive signal light transmitted from the demultiplexer 225 and transmit the received signal light to other communications apparatuses that are not depicted.

The multiplexer 224 combines the signal light of wavelengths $\lambda 21$ to $\lambda 23$ respectively from the communications apparatuses 221 to 223 to perform wavelength division multiplexing. The multiplexer 224 transmits the wavelength division multiplexed WDM signal light to the multiplex communications apparatus 210. The demultiplexer 225 splits the WDM signal light transmitted from the multiplex communications apparatus 210 to perform wavelength demultiplexing. The demultiplexer 225 outputs the demultiplexed signal light of wavelengths $\lambda 21$ to $\lambda 23$ to the communications apparatuses 221 to 223, respectively.

In the communications system 200, the communications apparatuses 211 to 213 each communicate with a communications apparatus 221 to 223 corresponding thereto in terms of wavelength. Here, wavelength channel ch11 is assumed for communications from the communications apparatus 211 to the communications apparatus 221, wavelength channel ch12 is assumed for communications from the communications apparatus 212 to the communications apparatus 222, and wavelength channel ch13 is assumed for communications from the communications apparatus 213 to the communications apparatus 223. Further, wavelength channel ch21 is assumed for communications from the communications apparatus 221 to the communications apparatus 211, wavelength channel ch22 is assumed for communications from the communications apparatus 222 to the communications apparatus 212, and wavelength channel ch23 is assumed for communications from the communications apparatus 223 to the communications apparatus 213.

The communications apparatus 110 and the communications apparatus 120 depicted in FIG. 1, for example, can be applied to wavelength channel ch11, whereby the frequency of the signal light transmitted by the communications apparatus 211 is changed, enabling a difference in the frequency to be induced between the signal light of wavelength channel ch11 and the signal light of the adjacent channel, wavelength channel ch12. Thus, a difference in the phase of the signal light of wavelength channel ch11 and that of the signal light of wavelength channel ch12 occurs, enabling variation of the frequency of the signal light, caused by cross phase modulation, to be suppressed.

Furthermore, the communications apparatus 110 and the communications apparatus 120 depicted in FIG. 1 may be applied to wavelength channel ch12, whereby a difference in the phase of the signal light of wavelength channel ch12 and that of the signal light of the adjacent channel (wavelength channel ch13) occurs, enabling variation of the frequency of the signal light, caused by cross phase modulation, to be suppressed.

Similarly, the communications apparatus 110 depicted in FIG. 1 and the communications apparatus 120 may be applied to wavelength channel ch13. In this manner, by applying at least one of among the communications apparatus 110 and the communications apparatus 120, which have adjacent wavelength channels, the respective frequencies of the signal light of the adjacent wavelength channels can be caused to differ, whereby variation of the frequency of the signal light can be suppressed.

Further, the communications apparatus 110 depicted and the communications apparatus 120 in FIG. 1, for example, may be applied to wavelength channel ch21, whereby a difference in the phase of the signal light of wavelength channel ch21 and that of the signal light of wavelength channel ch22 occurs, enabling variation of the frequency of the signal light, caused by cross phase modulation, to be suppressed. Similarly, the communications apparatus 110 and the communications apparatus 120 may be applied to wavelength channel ch22 or wavelength channel ch23. In this manner, bi-directionality can be applied between the communications apparatus 110 and the communications apparatus 120.

Figure 3:
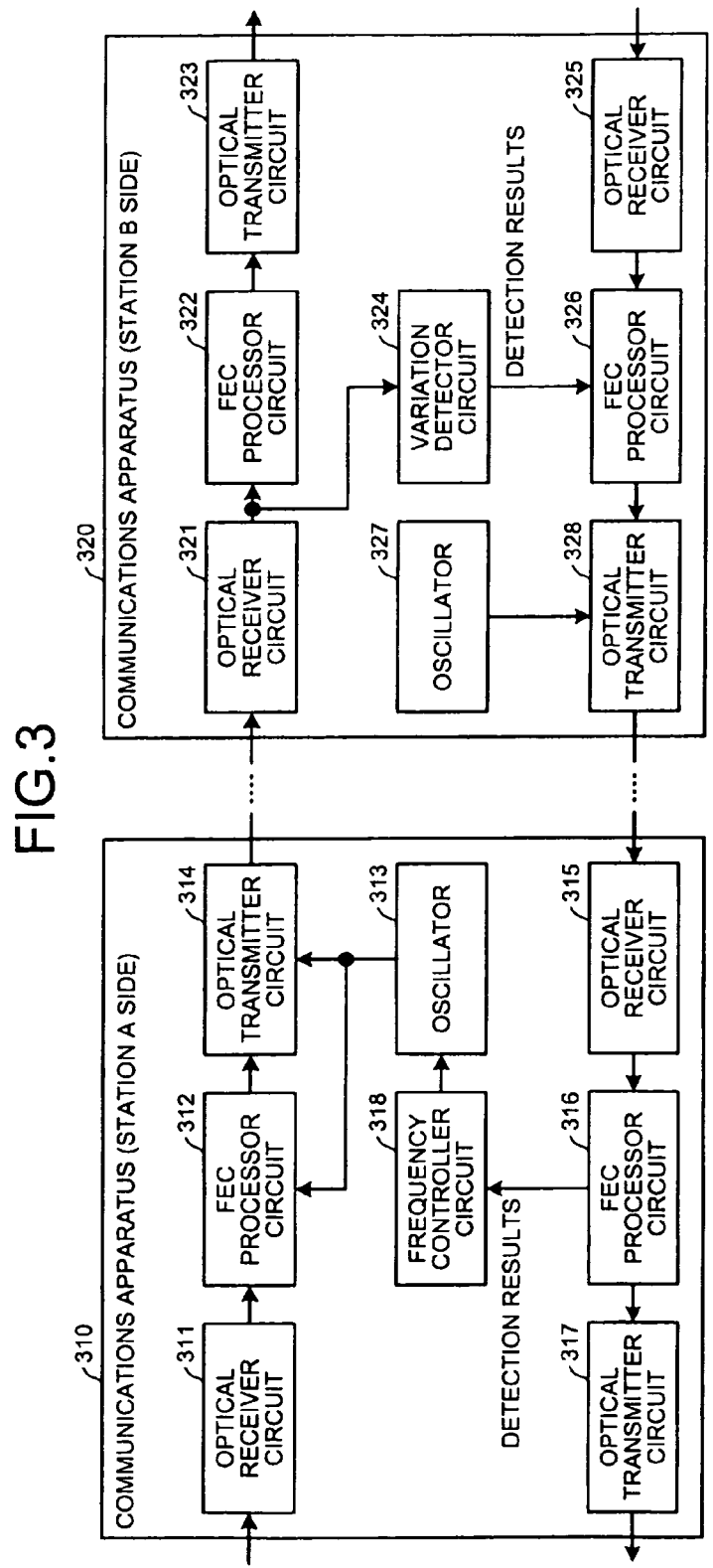
FIG. 3 is a diagram depicting an example of a communications apparatus.

FIG. 3 is a diagram depicting an example of the communications apparatus. A communications apparatus 310 depicted in FIG. 3 is a first communications apparatus that can be used for each of the communications apparatuses 211 to 213 on the station A side depicted in FIG. 2 and is an example of the communications apparatus 110 depicted in FIG. 1. A communications apparatus 320 is a second communications that can be used for each of the communications apparatuses 221 to 223 on the station B side depicted in FIG. 2 and is an example of the communications apparatus 120 depicted in FIG. 1. Further, the communications apparatus 310 and the communications apparatus 320 communicate signal light. Although, the signal light communicated between the communications apparatus 310 and the communications apparatus 320 is transmitted by wavelength division multiplexing, in FIG. 3 depiction of transmission by wavelength division multiplexing is omitted.

The communications apparatus 310 on the station A side includes an optical receiver circuit 311, an FEC processor circuit 312, an oscillator 313, an optical transmitter circuit 314, an optical receiver circuit 315, an FEC processor circuit 316, an optical transmitter circuit 317, and a frequency controller circuit 318.

The transmitter 111 depicted in FIG. 1, for example, can be implemented by the FEC processor circuit 312, the oscillator 313, and the optical transmitter circuit 314. The receiver 112 depicted in FIG. 1, for example, can be implemented by the optical receiver circuit 315 and the FEC processor circuit 316. The controller 113 depicted in FIG. 1, for example, can be implemented by the frequency controller circuit 318, the oscillator 313, and the FEC processor circuit 312.

The optical receiver circuit 311 demodulates signal light from other communications apparatuses and outputs the demodulated signal to the FEC processor circuit 312. The FEC processor circuit 312 encodes by forward error correction (FEC), the signal output from the optical receiver circuit 311. In the encoding by FEC, for example, block encoding or convolution encoding can be used. The FEC processor circuit 312 outputs the encoded signal to the optical transmitter circuit 314.

Further, the FEC processor circuit 312, according to the frequency of a clock signal output from the oscillator 313, adjusts the number of stuff bits stored in the FEC overhead (OH). A stuff bit is a redundant bit that is inserted for speed adjustment.

The oscillator 313 oscillates a clock signal that is a carrier transmitted by the optical transmitter circuit 314 and that is output to the FEC processor circuit 312 and the optical transmitter circuit 314. Further, the oscillator 313, under the control of the frequency controller circuit 318, changes the frequency of the clock signal to be output. The oscillator 313, for example, can be implemented by a voltage controlled oscillator (VCO) that controls the oscillated frequency by the voltage applied. The optical transmitter circuit 314, using a signal output from the FEC processor circuit 312, phase modulates the clock signal output from the oscillator 313. The optical transmitter circuit 314 transmits to the communications apparatus 320, the signal light obtained by the phase modulation.

The optical receiver circuit 315 demodulates signal light transmitted from the communications apparatus 320 and outputs the demodulated signal to the FEC processor circuit 316. The FEC processor circuit 316 applies FEC error correction coding to the signal output from the optical receiver circuit 315 and outputs the encoded signal to the optical transmitter circuit 317. Further, the FEC processor circuit 316 acquires the detection results stored in the FEC overhead (OH). The detection results are the detection results concerning variation of the frequency of signal light output by the optical transmitter circuit 314. The FEC processor circuit 316 outputs the acquired detection results to the frequency controller circuit 318.

The optical transmitter circuit 317 transmits to other communications apparatuses by signal light, the signal output from the FEC processor circuit 316. The frequency controller circuit 318, based on the detection results output from the FEC processor circuit 316, controls the frequency of the clock signal output by the oscillator 313.

The communications apparatus 320 on the station B side includes an optical receiver circuit 321, an FEC processor circuit 322, an optical transmitter circuit 323, a variation detector circuit 324, an optical receiver circuit 325, an FEC processor circuit 326, an oscillator 327, and an optical transmitter circuit 328.

The receiver 121 depicted in FIG. 1, for example, can be implemented by the optical receiver circuit 321. The detector 122 depicted in FIG. 1, for example, can be implemented by the variation detector circuit 324. The transmitter 123 depicted in FIG. 1, for example, can be implemented by the FEC processor circuit 326 and the optical transmitter circuit 328.

The optical receiver circuit 321 demodulates the signal light transmitted from the communications apparatus 310 and outputs the demodulated signal to the FEC processor circuit 322 and the variation detector circuit 324. The FEC processor circuit 322 applies FEC error correcting code to the signal output from the optical receiver circuit 321 and outputs the encoded signal to the optical transmitter circuit 323. The optical transmitter circuit 323 transmits to other communications apparatuses by signal light, the signal output from the FEC processor circuit 322.

The variation detector circuit 324, based on the signal output from the optical receiver circuit 321, detects variation of the frequency of the signal light received by the optical receiver circuit 321. For example, the variation detector circuit 324 detects in the signal output from the optical receiver circuit 321, a component slowly varying in strength (for example, refer to FIGS. 8, 9-1, 9-2, and 10). The variation detector circuit 324 outputs to the FEC processor circuit 326, the detection results concerning frequency variation.

The optical receiver circuit 325 demodulates signal light from other communications apparatuses and outputs a demodulated signal to the FEC processor circuit 326. The FEC processor circuit 326 encodes by FEC, the signal output from the optical receiver circuit 325. In the encoding by FEC, for example, block encoding or convolution encoding can be used. The FEC processor circuit 326 outputs the encoded signal to the optical transmitter circuit 328. Further, the FEC processor circuit 326 stores to the FEC OH, the detection results concerning frequency variation, output from the variation detector circuit 324. Consequently, the detection results concerning frequency variation are fed back to the communications apparatus 310.

The oscillator 327 oscillates a clock signal that is a carrier transmitted by the oscillator 327 and output to the optical transmitter circuit 328. The optical transmitter circuit 328, using the signal output from the FEC processor circuit 326, phase modulates the clock signal output from the oscillator 327 and outputs to the communications apparatus 310, the signal light obtained by the phase modulation.

Further, the communications apparatuses 310, 320 may respectively have the functions of the other. For example, the communications apparatus 310 may detect variation of the frequency of the signal light received from the optical receiver circuit 315, while at the FEC processor circuit 312, detection results are stored to the FEC OH. The communications apparatus 320, at the FEC processor circuit 322, may acquire the detection results from the FEC OH and based on the acquired detection results, change the frequency of signal light transmitted from the optical transmitter circuit 328. Consequently, the operations depicted in FIG. 3 can be performed bi-directionally.

Figure 4:
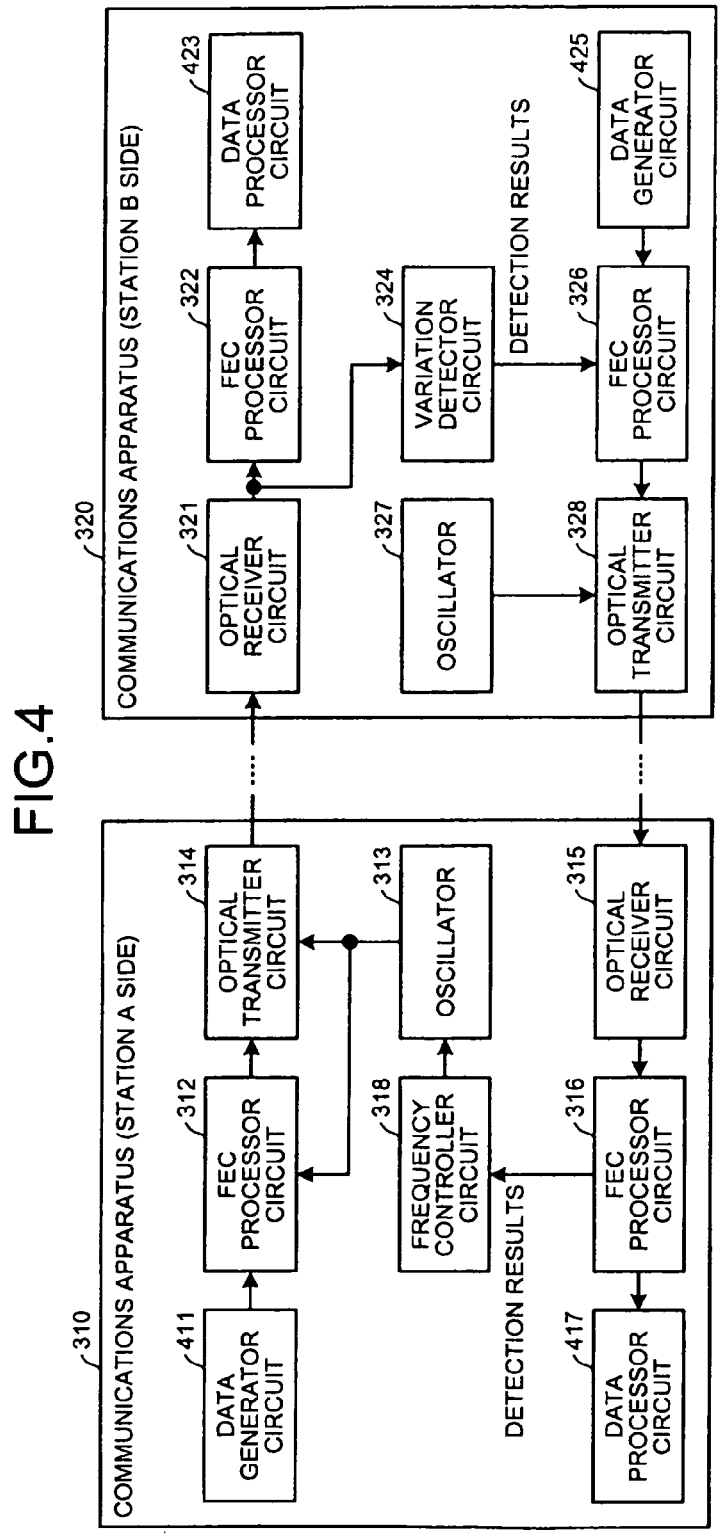
FIG. 4 is a diagram depicting an example of modification of the communications apparatus.

FIG. 4 is a diagram depicting an example of modification of the communications apparatus. In FIG. 4, components identical to those depicted in FIG. 3 are given the same reference numerals used in FIG. 3 and description thereof is omitted. Although the communications apparatus 310 depicted in FIG. 3 has been described as a repeater apparatus, the communications apparatus 310 may be terminal communications apparatus. For example, as depicted in FIG. 4, the communications apparatus 310 may include a data generator circuit 411 and a data processor circuit 417 in place of the optical receiver circuit 311 and the optical transmitter circuit 317.

The data generator circuit 411 generates a signal to be transmitted to the communications apparatus 320. The data generator circuit 411 outputs the generated signal to the FEC processor circuit 312. The FEC processor circuit 312 encodes by FEC, the signal output from the data generator circuit 411. The FEC processor circuit 316 outputs a decoded signal to the data processor circuit 417. The data processor circuit 417 processes the signal output from the FEC processor circuit 316.

Further, although the communications apparatus 320 depicted in FIG. 3 has been described as a repeater apparatus, the communications apparatus 320 may be a terminal communications apparatus. For example, as depicted in FIG. 4, the communications apparatus 320 may include a data processor circuit 423 and a data generator circuit 425 in place of the optical transmitter circuit 323 and the optical receiver circuit 325.

The FEC processor circuit 322 outputs a decoded signal to the data processor circuit 423. The data processor circuit 423 processes the signal output from the FEC processor circuit 322. The data generator circuit 425 generates a signal to be transmitted to the communications apparatus 310. The data generator circuit 425 outputs the generated signal to the FEC processor circuit 326. The FEC processor circuit 326 encodes by FEC, the signal output from the data generator circuit 425.

Figure 5:
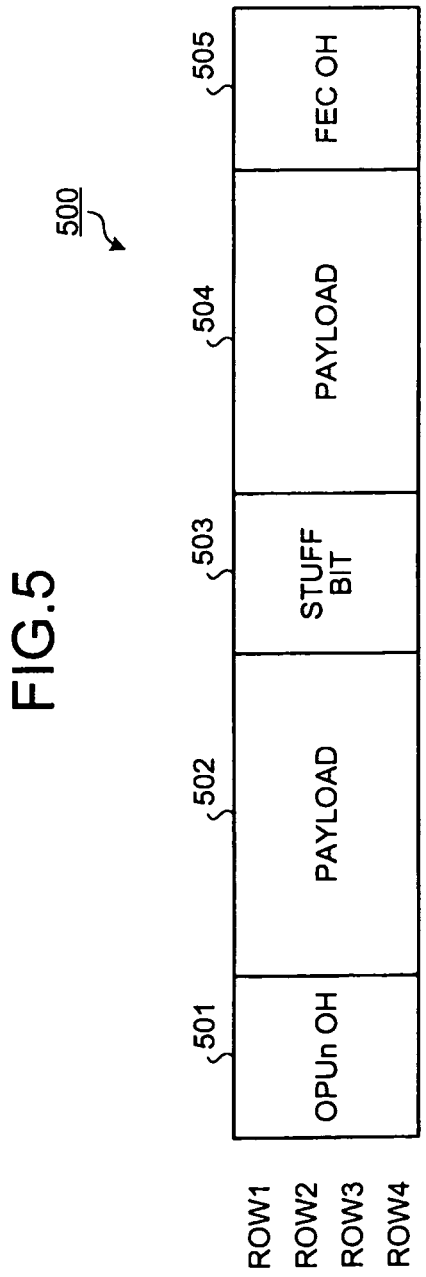
FIG. 5 is a diagram depicting an example of a frame of signal light.

FIG. 5 is a diagram depicting an example of a frame of signal light. A frame 500 depicted in FIG. 5 represents a frame of signal light communicated between the communications apparatus 310 and the communications apparatus 320. The frame 500 has 4 rows (ROW1 to ROW4) and includes OPU overhead (OPUn OH) 501, a payload 502, stuff bits 503, a payload 504, and FEC OH 505.

First, the frame 500 transmitted from the communications apparatus 310 in the station A side to the communications apparatus 320 will be described. The payloads 502, 504 of the frame 500 transmitted by the communications apparatus 310 are client signals output from the optical receiver circuit 311 or the data generator circuit 411 of the communications apparatus 310, to the FEC processor circuit 312. The FEC processor circuit 312 outputs to the optical transmitter circuit 314, the frame 500, which has the OPU OH 501, the stuff bits 503, and the FEC OH 505 appended to the payloads 502, 504.

Further, the FEC processor circuit 312 changes the amount (length) of the stuff bits 503, according to increases/decreases in the frequency output from the oscillator 313 and thereby changes the frequency (transmission speed) of the signal light transmitted from the optical transmitter circuit 314. The FEC processor circuit 322 of the communications apparatus 320 uses the FEC OH 505 of the frame 500 received from the communications apparatus 310 to apply error correction coding to the payloads 502, 504.

Next, the frame 500 transmitted from the communications apparatus 320 on the station B side to the communications apparatus 310 will be described. The payloads 502, 504 of the frame 500 transmitted by the communications apparatus 320 are client signals output from the optical receiver circuit 325 or the data generator circuit 425 of the communications apparatus 320 to the FEC processor circuit 326. The FEC processor circuit 326 outputs to the optical transmitter circuit 328, the frame 500, which has the OPU OH 501, the stuff bits 503, and the FEC OH 505 appended to the payloads 502, 504.

Further, the FEC processor circuit 326 stores to a user area of the FEC OH 505, the detection results concerning frequency variation, output from the variation detector circuit. The FEC processor circuit 316 of the communications apparatus 310, using the FEC OH 505 of the frame 500 received from the communications apparatus 320, applies error correction coding to the payloads 502, 504. Further, the FEC processor circuit 316 acquires the detection results stored in the FEC OH 505 of the frame 500 received from the communications apparatus 320.

In this manner, the frequency variation related detection results in the communications apparatus 320 are, for example, stored to the overhead of the signal transmitted from the communications apparatus 320 to the communications apparatus 310 and are transmitted. Consequently, even without generation of a frame to transmit the detection results concerning frequency variation, the detection results can be transmitted from the communications apparatus 320 to the communications apparatus 310. Although description has been given using FEC OH as signal overhead, overhead other than FEC OH may be used.

Further, the communications apparatus 310 can change the frequency of signal light by, for example, changing the amount of stuff bits included in the signal light to be transmitted. For example, the communications apparatus 310 changes the frequency of the signal light by changing the amount of FEC stuff bits. Consequently, since the communications apparatus 320 can recognize by FEC communication, increases and decreases in the stuff bits of the signal light from the communications apparatus 310, signal light, whose frequency varies, can be easily received.

Figure 6:
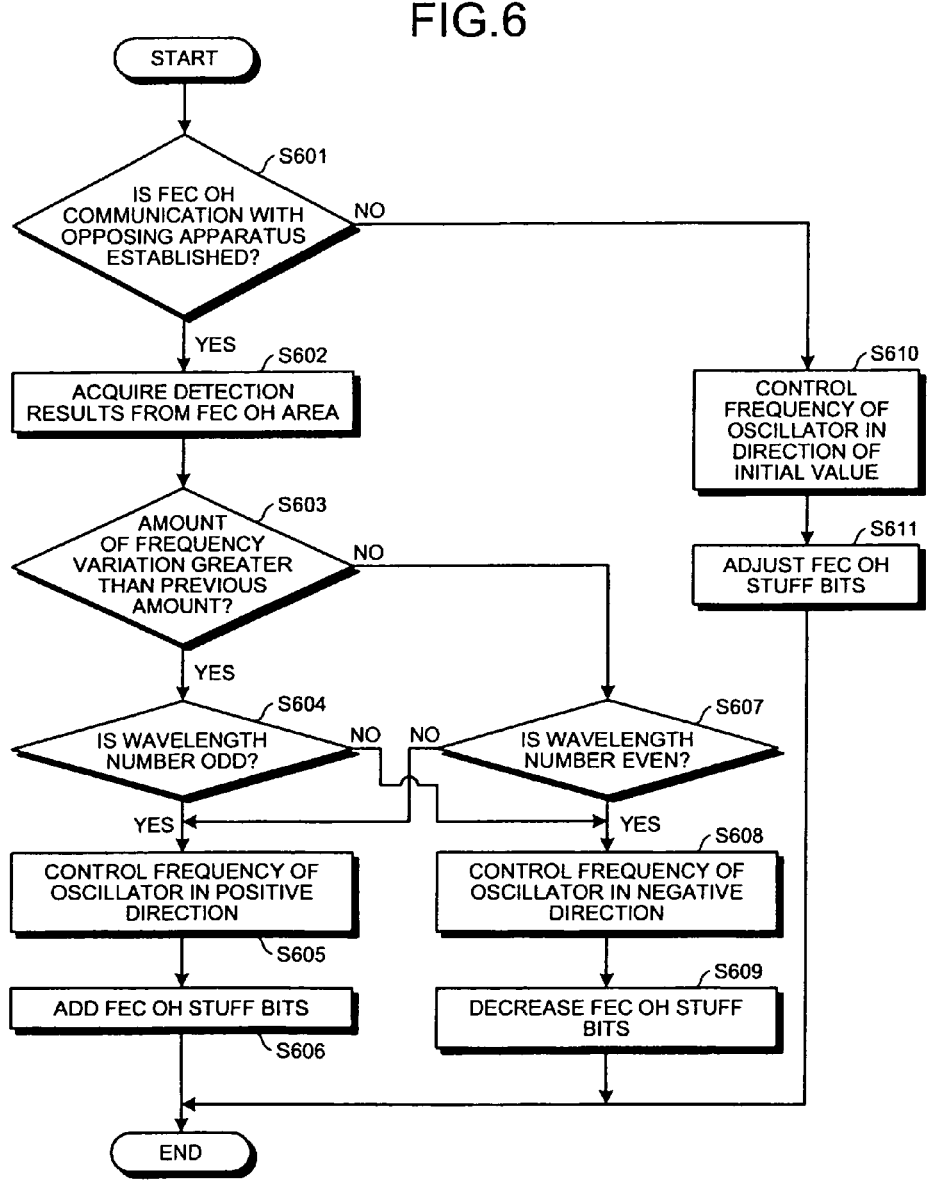
FIG. 6 is a flowchart of an example of processing by the communications apparatus on station A side.

FIG. 6 is a flowchart of an example of processing by the communications apparatus on the station A side. The communications apparatus 310 on the station A side, for example, repeatedly executes each step depicted in FIG. 6. First, the FEC processor circuit 316 determines whether FEC OH communication with an opposing apparatus has been established (the communications apparatus 320) (step S601). If FEC OH communication with the opposing apparatus has been established (step S601: YES), the FEC processor circuit 316 acquires detection results concerning frequency variation, from the FEC OH area between the communications apparatus 310 and the opposing apparatus (step S602).

Next, the frequency controller circuit 318 determines whether the amount of frequency variation indicated by the detection results acquired at the current execution of step S602 is greater than the amount of frequency variation indicated at the previous execution of step S602 and stored in memory (step S603). Further, the frequency controller circuit 318 stores to the memory of the communications apparatus 310, the amount of frequency variation indicated by the detection results acquired at the current execution of step S602.

At step S603, if the current amount of frequency variation is greater than the previous amount of frequency variation (step S603: YES), the frequency controller circuit 318 determines whether the wavelength number indicating the wavelength channel of the communications apparatus 310 is an odd number (step S604). If the wavelength number of the communications apparatus 310 is an odd number (step S604: YES), the frequency controller circuit 318 controls the frequency of the oscillator 313 in a positive direction (step S605).

Next, the FEC processor circuit 312 adds FEC OH stuff bits, according to the controlled frequency at step S605 (step S606), ending a series of the operations. At step S604, if the wavelength number of the communications apparatus 310 is not an odd number (step S604: NO), the flow transitions to step S608.

At step S603, if the current amount of frequency variation is not greater than the previous amount of frequency variation (step S603: NO), the frequency controller circuit 318 determines whether the wavelength number of the communications apparatus 310 is an even number (step S607). If the wavelength number of the communications apparatus 310 is not an even number (step S607: NO), the flow transitions to step S605.

At step S607, if the wavelength number of the communications apparatus 310 is an even number (step S607: YES), the frequency controller circuit 318 controls the frequency of the oscillator 313 in a negative direction (step S608). Next, the FEC processor circuit 312 decreases the FEC OH stuff bits, according to the controlled frequency at step S608 (step S609), ending a series of operations.

At step S601, if FEC OH communication with the opposing apparatus is not established (step S601: NO), the frequency controller circuit 318 controls the frequency of the oscillator 313 in the direction of an initial value (step S610). Next, the FEC processor circuit 312 adjusts the FEC OH stuff bits, according to the controlled frequency at step S610 (step S611), ending a series of the operations.

At step S610, if the frequency of the oscillator 313 is controlled in a positive direction, at step S611, stuff bits of the FEC OH are added. At step S610, if the frequency of the oscillator 313 is controlled in a negative direction, at step S611, stuff bits of the FEC OH are decreased.

By each of the steps above, for the communications apparatus 310 having a wavelength number that is an odd number, when the amount of frequency variation increases, the frequency of the signal light is controlled in a positive direction until the amount of frequency variation stops increasing. Further, for the communications apparatus 310 having a wavelength number that is an even number, if the amount of frequency variation has increased from the previous amount, the frequency of the signal light is controlled in a negative direction until the amount of frequency variation stops increasing. Therefore, for the wavelength channels of wavelengths $\lambda n-2$, $\lambda n-1$, $\lambda n$, $\lambda n+1$, . . . respectively, the frequency of the signal light is controlled in a negative direction, a positive direction, a negative direction, a positive direction, . . . .

Further, for the wavelength channels of wavelengths $\lambda n-2$, $\lambda n-1$, $\lambda n$, $\lambda n+1$, . . . respectively, the frequency of signal light may be controlled in a zero direction, a negative direction, a zero direction, a negative direction, . . . . A zero direction means that the frequency is not controlled. Further, for the wavelength channels of wavelength $\lambda n-2$, $\lambda n-1$, $\lambda n$, on+1, . . . respectively, the frequency of the signal light may be controlled in a zero direction, a positive direction, a zero direction, a positive direction, . . . .

The wavelength channels of wavelengths $\lambda n-2$, $\lambda n-1$, $\lambda n$, $\lambda n+1$, . . . respectively, the frequency of the signal light may be controlled in a negative direction, a zero direction, a positive direction, a negative direction, a zero direction, a positive direction. Further, for the wavelength channels of wavelengths $\lambda n-2$, $\lambda n-1$, $\lambda n$, $\lambda n+1$, . . . respectively, the frequency of the signal light may be controlled in a positive direction, a zero direction, a negative direction, a positive direction, a zero direction, a negative direction, . . . .

In this manner, the frequency controller circuit 318 of the communications apparatuses 310 having adjacent wavelength channels change the frequency of signal light in relatively different directions, if an increase in the amount of frequency variation is detected. Consequently, the frequency of signal light of adjacent wavelength channels are prevented from be controlled in the same direction, enabling differences in signal light frequency to be surely induced between adjacent wavelength channels.

Figure 7:
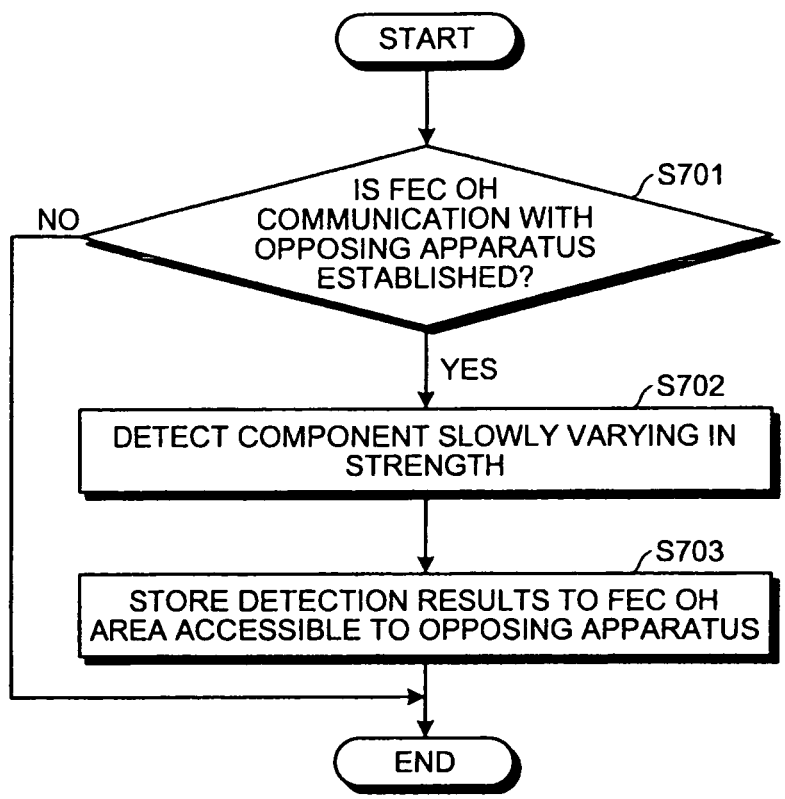
FIG. 7 is a flowchart of an example of the processing by the communications apparatus on station B side.

FIG. 7 is a flowchart of an example of the processing by the communications apparatus on the station B side. The communications apparatus 320 on the station B side, for example, repeatedly executes each step depicted in FIG. 7. First, the FEC processor circuit 326 determines whether FEC OH communication with the opposing apparatus (the communications apparatus 310) has been established (step S701). If FEC OH communication with the opposing apparatus has not been established (step S701: NO), a series of the processes ends.

At step S701, if FEC OH communication with the opposing apparatus has been established (step S701: YES), the variation detector circuit 324 detects in the signal output from the opposing apparatus, a component slowly varying in strength (step S702), whereby a variation of the frequency of the signal light received from the opposing apparatus can be detected. Next, the FEC processor circuit 326 stores to the FEC OH area between the communications apparatus 320 on the station B side and the opposing apparatus, the detection results concerning frequency variation, obtained at step S702 (step S703), ending a series of the operations. Consequently, the detection results that indicate frequency variation and are obtained at step S702 can be transmitted to the opposing apparatus.

Figure 8:
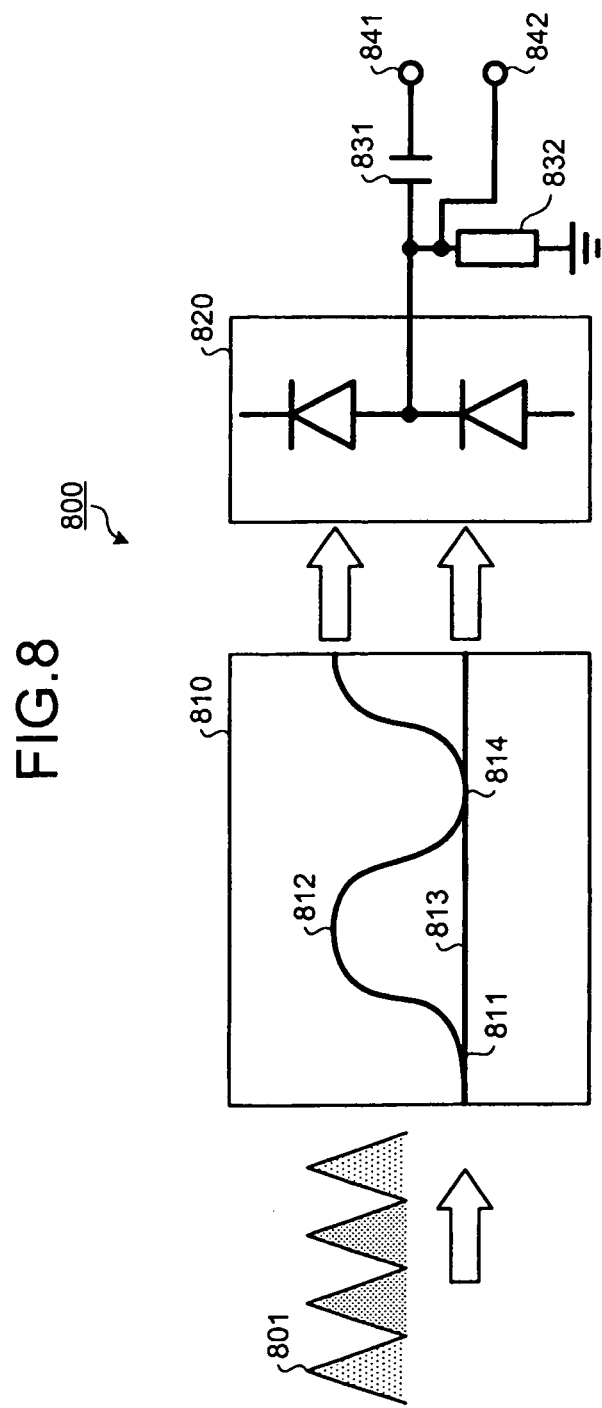
FIG. 8 is a diagram depicting an example of an optical receiver circuit and a variation detector circuit.

FIG. 8 is a diagram depicting an example of the optical receiver circuit and the variation detector circuit. A monitor circuit 800 depicted in FIG. 8 implements the optical receiver circuit 321 and the variation detector circuit 324 depicted in FIG. 3. The monitor circuit 800 includes a demodulator 810, an optical receiver 820, a capacitor 831, a resistor 832, and output units 841, 842.

The demodulator 810 is a Mach-Zehnder interferometer the converts phase modulated signal light 801 into strength modulated signal light. For example, the demodulator 810 includes a splitter 811, waveguides 812, 813, and an interference unit 814. The splitter 811, the waveguides 812, 813 and the interference unit 814, for example, are an optical waveguide formed on a substrate.

The splitter 811 splits light (signal light) that has been input and outputs the branches of the split light to the waveguide 812 and the waveguide 813, respectively. The waveguide 812 and the waveguide 813 output to the interference unit 814, the light output from the splitter 811. Further, the waveguide 812 and the waveguide 813 have a difference in delay, inducing a delay difference on the branches of light output to the interference unit 814.

The delay difference of the waveguide 812 and the waveguide 813 is controlled such that the phases of the carrier frequency of the light output to the interference unit 814 coincide. The interference unit 814 causes the light respectively output from the waveguide 812 and the waveguide 813 to interfere and outputs the resulting beams of light to the optical receiver 820. Consequently, the phase modulated signal light input to the demodulator 810 is converted to strength modulated signal light and output to the optical receiver 820.

The optical receiver 820 performs balanced reception of the light output from the demodulator 810 and outputs the signal (electrical signal) obtained by the balanced reception. The signal output from the optical receiver 820 is output to the output unit 841, via the capacitor 831. The output unit 841 outputs to the FEC processor circuit 322, the signal output from the optical receiver 820, whereby the signal resulting from demodulation of the signal light can be output to the FEC processor circuit 322.

One end of the resistor 832 is connected between the optical receiver 820 and the capacitor 831, while the other end is grounded. The output unit 842 is connected between the resistor 832 and the optical receiver 820. Since the resistor 832 operates as a low pass filter, the output unit 842 outputs a component slowly varying in strength (alternating current component) from the signal output from the optical receiver 820. The component slowly varying in strength from the signal output from the output unit 842 is output to the FEC processor circuit 326, as detection results concerning frequency variation. In this manner, by detecting in the received signal light, a component that slowly (below a given rate) changes in strength, variation of the frequency of the received signal light can be detected.

Figure 9A:
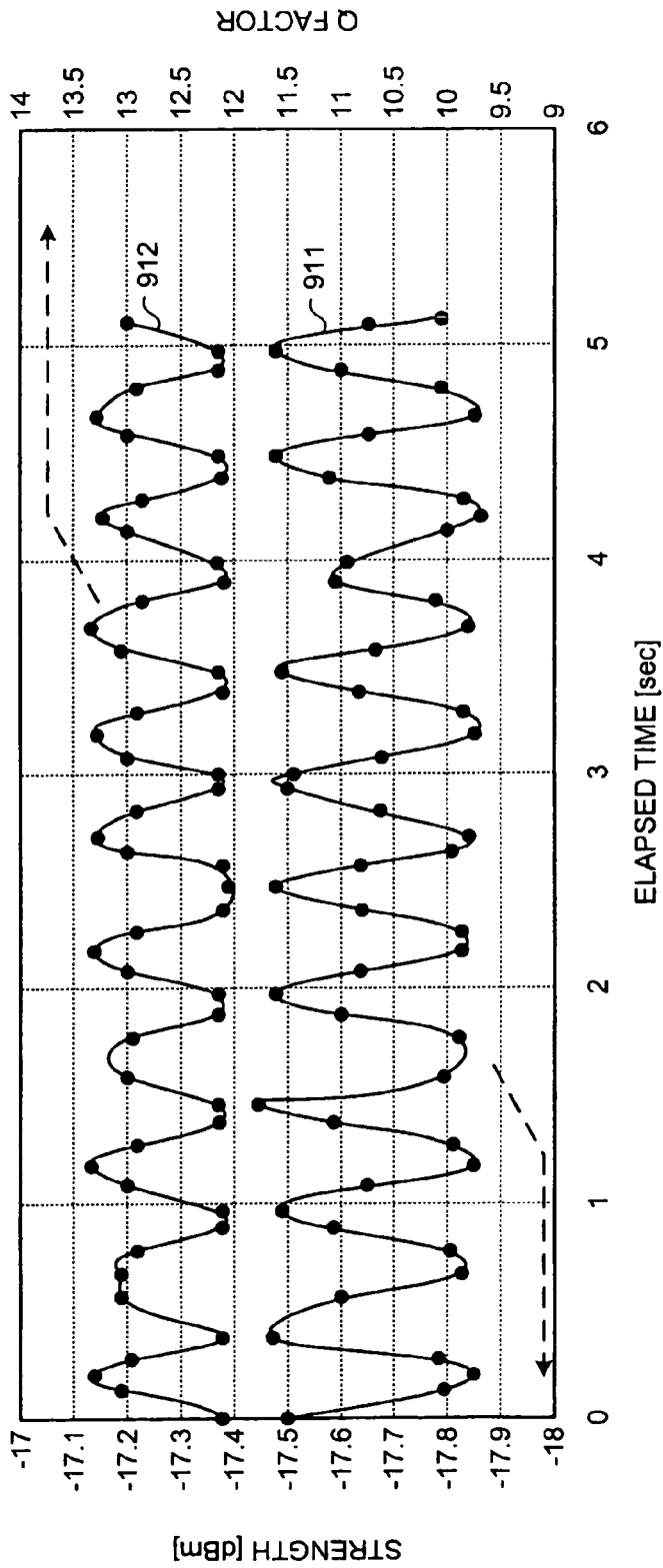
FIGS. 9A and 9B are diagrams depicting the relationship between frequency variation and a component slowly varying in strength in the signal light.
Figure 9B:
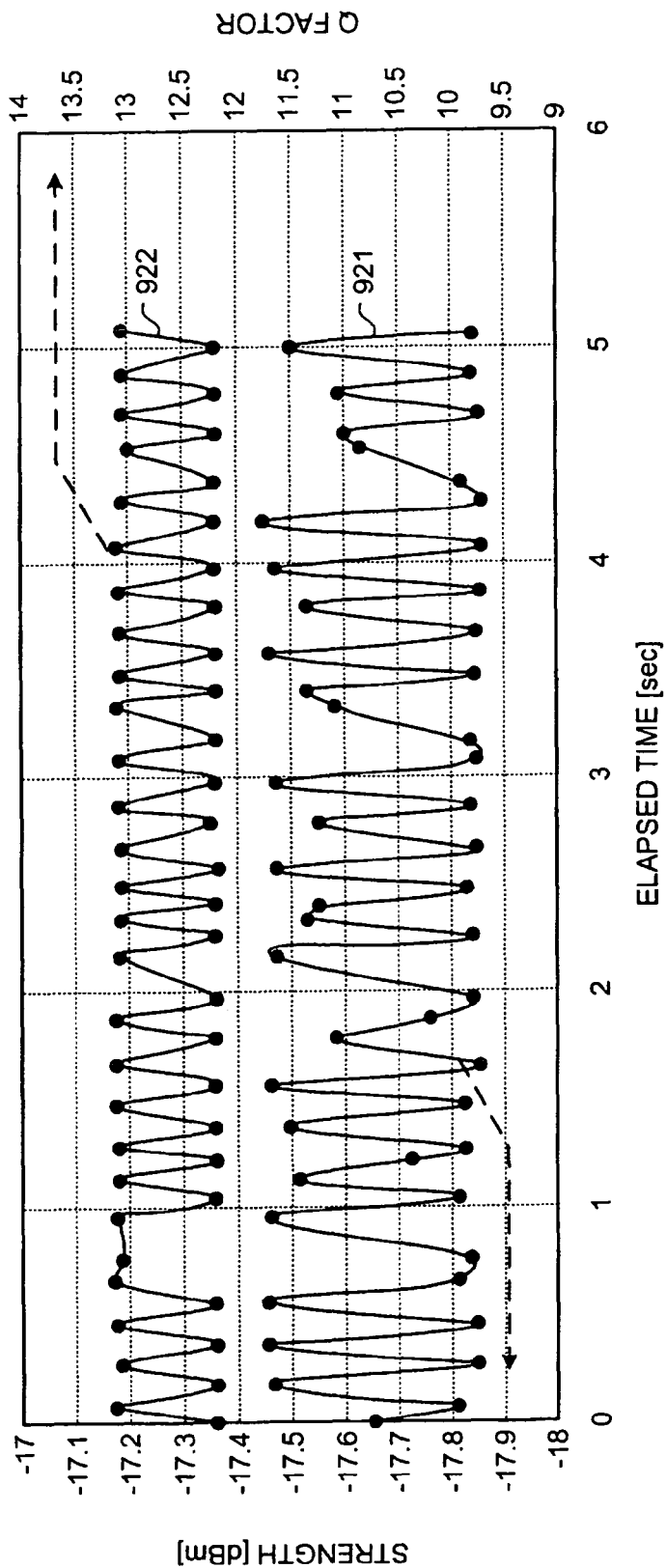

FIGS. 9A and 9B are diagrams depicting the relationship between frequency variation and the component slowly varying in strength in the signal light. In FIGS. 9A and 9B, the horizontal axis represents elapsed time [sec]; the vertical axis on the left represents the strength of the received signal light [dBm]; and the vertical axis on the right represents the Q factor of the received signal light.

FIG. 9A depicts measurement results when the frequency difference of the signal light with that of an adjacent channel is 2 [Hz], relatively small, and the variation of the frequency of the signal light is relatively large. Strength variation 911 depicted in FIG. 9A depicts variation of the strength of the received signal light. A Q factor variation 912 depicted in FIG. 9A depicts variation of the Q factor of the received signal light. As depicted by the strength variation 911 and the Q factor variation 912, when the frequency differs from that of the adjacent channel by 2 [Hz], the strength and the Q factor of the received signal light vary by 2 [Hz].

FIG. 9B depicts measurement results when the frequency difference with that of the adjacent channel is 5 [Hz], relatively large, and the variation of the frequency of the signal light is relatively large. A strength variation 921 depicted in FIG. 9B depicts variation of the strength of the received signal light. A Q factor variation 922 depicted in FIG. 9B depicts variation of the Q factor of the received signal light. As depicted by the strength variation 921 and the Q factor variation 922, when the frequency of the signal light differs from that of the adjacent channel by 5 [Hz], the strength and the Q factor of the received signal light vary by 5 [Hz].

As depicted by the strength variation 911 in FIG. 9A, when the frequency difference of the signal light is relatively small and the variation of the frequency of the signal light is relatively large, a low-speed (e.g., 2 [Hz]) strength variation component arises in the power of the received signal light. On the other hand, as depicted by the strength variation 921 in FIG. 9B, when the frequency difference of the signal light is relatively large and the variation of the frequency of the signal light is relatively small, a component slowly varying in strength does not arise in the power of the received signal light. Therefore, for example, detection of a component slowly varying in strength in the received signal light by the monitor circuit 800 depicted in FIG. 8 enables variation of the frequency of the received signal light to be detected.

Figure 10:
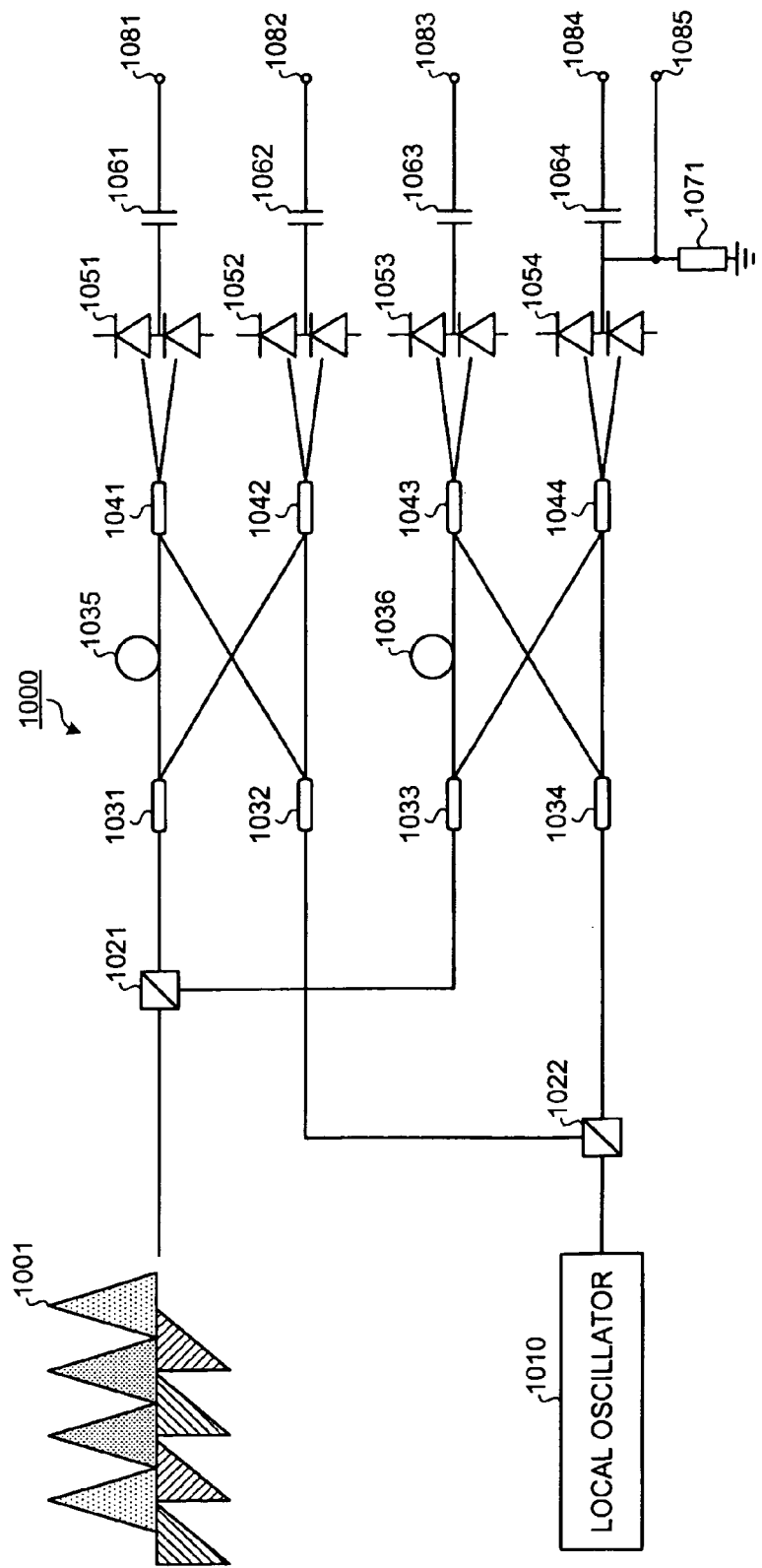
FIG. 10 is a diagram of an example of modification of the optical receiver circuit and the variation detector circuit.

FIG. 10 is a diagram of an example of modification of the optical receiver circuit and the variation detector circuit. A monitor circuit 1000 depicted in FIG. 10 implements the optical receiver circuit 321 and the variation detector circuit 324 depicted in FIG. 3. Here, an example will be described using polarization multiplexed signal light 1001 that is polarization multiplexed beams (2 beams) of phase modulated signal light.

The monitor circuit 1000 includes a local oscillator 1010, polarized beam splitters 1021, 1022, splitters 1031 to 1034, delay units 1035, 1036, interference units 1041 to 1044, optical receivers 1051 to 1054, capacitors 1061 to 1064, a resistor 1071, and output units 1081 to 1085. The local oscillator 1010 oscillates local light and outputs the light to the polarized beam splitter 1022. The local oscillator 1010 is, for example, a continuous wave (CW) optical source.

The polarization multiplexed signal light 1001 is input to the polarized beam splitter 1021. The polarized beam splitter 1021 splits the polarization multiplexed signal light 1001 according to H polarization and V polarization. The polarized beam splitter 1021 outputs the light of the H polarization to the splitter 1031 and outputs the light of the V polarization to the splitter 1033. The polarized beam splitter 1022 splits the local light output from the local oscillator 1010, according to the H polarization and the V polarization. The polarized beam splitter 1022 outputs the light of the H polarization to the splitter 1032 and outputs the light of the V polarization to the splitter 1034.

The splitter 1031 splits the light output from the polarized beam splitter 1021 and outputs the resulting branches of light to the delay unit 1035 and the interference unit 1042, respectively. The delay unit 1035 outputs to the interference unit 1041, the light output from the splitter 1031. The splitter 1032 splits the light output from the polarized beam splitter 1022 and outputs the resulting branches of light to the interference unit 1041 and the interference unit 1042, respectively.

The splitter 1033 splits the light output from the polarized beam splitter 1021 and outputs the resulting branches of light to the delay unit 1036 and the interference unit 1044, respectively. The delay unit 1036 outputs to the interference unit 1043, the light output from the splitter 1033. The splitter 1034 splits the light output from the polarized beam splitter 1022 and outputs the resulting branches of light to the interference unit 1043 and the interference unit 1044, respectively.

The interference unit 1041 causes the light output from the delay unit 1035 and the light output from the splitter 1032 to interfere and outputs the resulting beams of light to the optical receiver 1051. The interference unit 1042 causes the light output from the splitter 1031 and the light output from the splitter 1032 to interfere and outputs the resulting beams of light to the optical receiver 1052.

The interference unit 1043 causes the light output from the delay unit 1036 and the light output from the splitter 1034 to interfere and outputs the resulting beams of light to the optical receiver 1053. The interference unit 1044 causes the light output from the splitter 1033 and the light output from the splitter 1034 to interfere and outputs the resulting beams of light to the optical receiver 1054.

The optical receivers 1051 to 1054 perform balanced reception of the respective beams of light output from the interference units 1041 to 1044 and output a signal (electrical signal) obtained by the balanced reception. The signals output from the optical receivers 1051 to 1054 are respectively output to the output units 1081 to 1084, via the capacitors 1061 to 1064. The output units 1081 to 1084 respectively output to the FEC processor circuit 322, the signals output from the optical receivers 1051 to 1054. The FEC processor circuit 322 applies error correction coding on the signals respectively output from the output units 1081 to 1084.

One end of the resistor 1071 is connected between the optical receiver 1054 and the capacitor 1064 and the other end is grounded. The output unit 1085 is connected between the resistor 1071 and the optical receiver 1054. Since the resistor 1071 operates as a low pass filter, the output unit 1085 outputs a component slowly varying in strength from the signal output from the optical receiver 1054. The component slowly varying in strength and output from the output unit 1085 is output to the FEC processor circuit 326, as detection results concerning variation of the frequency of the signal light.

In FIG. 10, although a configuration in which the resistor 1071 and the output unit 1085 are connected to the optical receiver 1054 has been described, provided the resistor 1071 and the output unit 1085 are connected to any one of the optical receivers 1051 to 1054, any such configuration may be adopted. In this manner, even in a coherent scheme that uses a local oscillator, variation of the frequency of the received signal light can be detected by detecting in the received signal light, a component slowly varying in strength.

Figure 11:
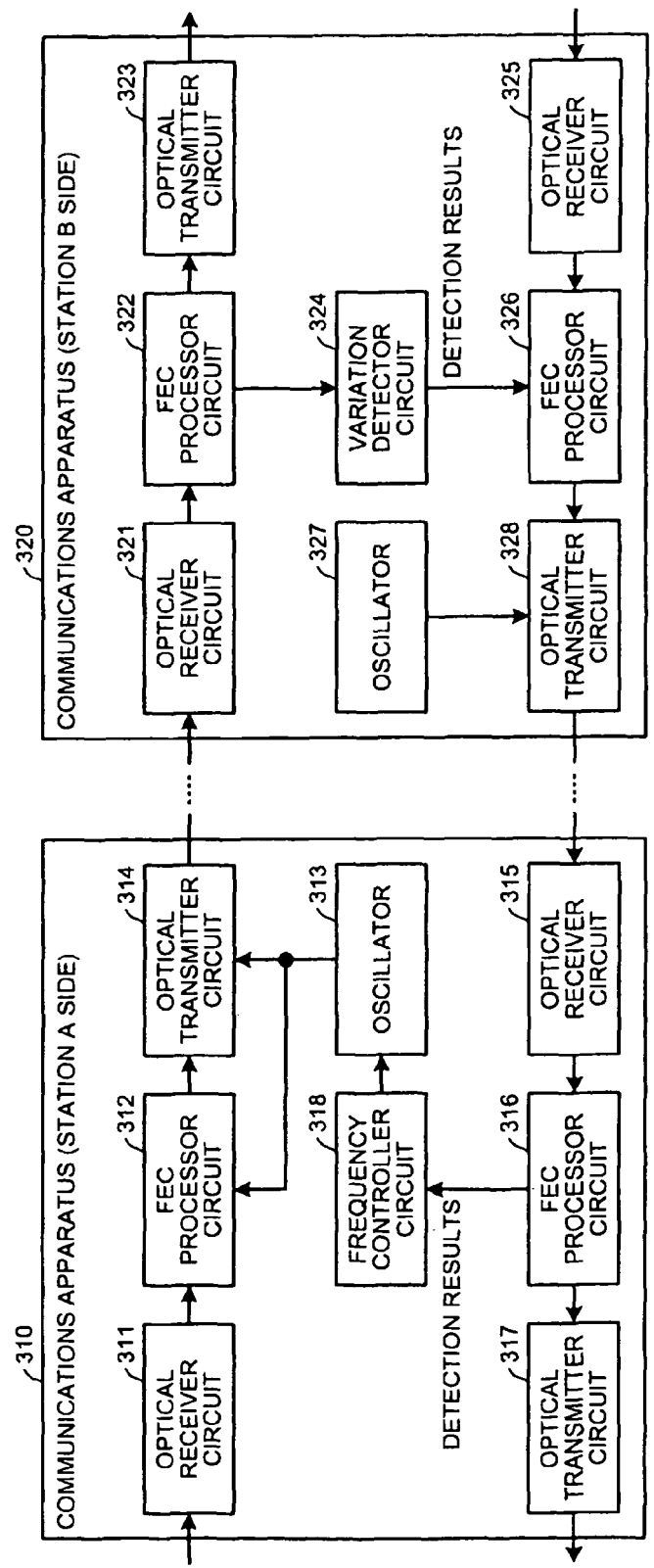
FIG. 11 is a diagram of an example of modification of the communications apparatus.

FIG. 11 is a diagram of an example of modification of the communications apparatus. In FIG. 11, components identical to those depicted in FIG. 3 are given the same reference numerals and description thereof is omitted. As depicted in FIG. 11, the FEC processor circuit 322 of the communications apparatus 320 outputs to the variation detector circuit 324, the quality of the signal output from the optical receiver circuit 321. Signal quality, for example, is the number of error corrections per unit time in the FEC processing, the error rate of the signal per unit time, etc.

The variation detector circuit 324 detects low-speed (below a given speed) variation of the quality of the signal output from the FEC processor circuit 322. Low-speed quality variation of the signal, for example, can be detected by calculating the average signal quality at given intervals and then calculating the difference between the calculated averages.

As depicted by the Q factor variation 912 in FIG. 9A, when the frequency variation of the signal is relatively large, low-speed variation (e.g., 2 [Hz]) of the Q factor of the received signal occurs. On the other hand, as depicted by Q factor variation 922 in FIG. 9B, when the frequency variation of the signal is relatively small, the low-speed variation of the Q factor of the received signal does not occur. Therefore, by detecting a low-speed variation of the quality of the received signal light, variation of the frequency of the received signal light can be detected.

In this manner, according to the communications system 100 of the first embodiment, based on the detection results concerning variation of the frequency of the signal light received by the communications apparatus 110, the frequency of the signal light to be transmitted by the communications apparatus 110 is changed, enabling a difference in signal frequency to be induced on the signal light of adjacent channels. For example, the communications apparatus 110 receives from the communications apparatus 120, detection results concerning frequency variation, whereby the frequency of the signal light can be changed based on the detection results.

Consequently, even if the power, the wavelength interval, etc. of each beam of signal light that is wavelength division multiplexed changes, differences in (signal light) phase can be induced between adjacent channels and variations in frequency caused by cross modulation can be suppressed. Consequently, communication quality can be improved.

Figure 12:
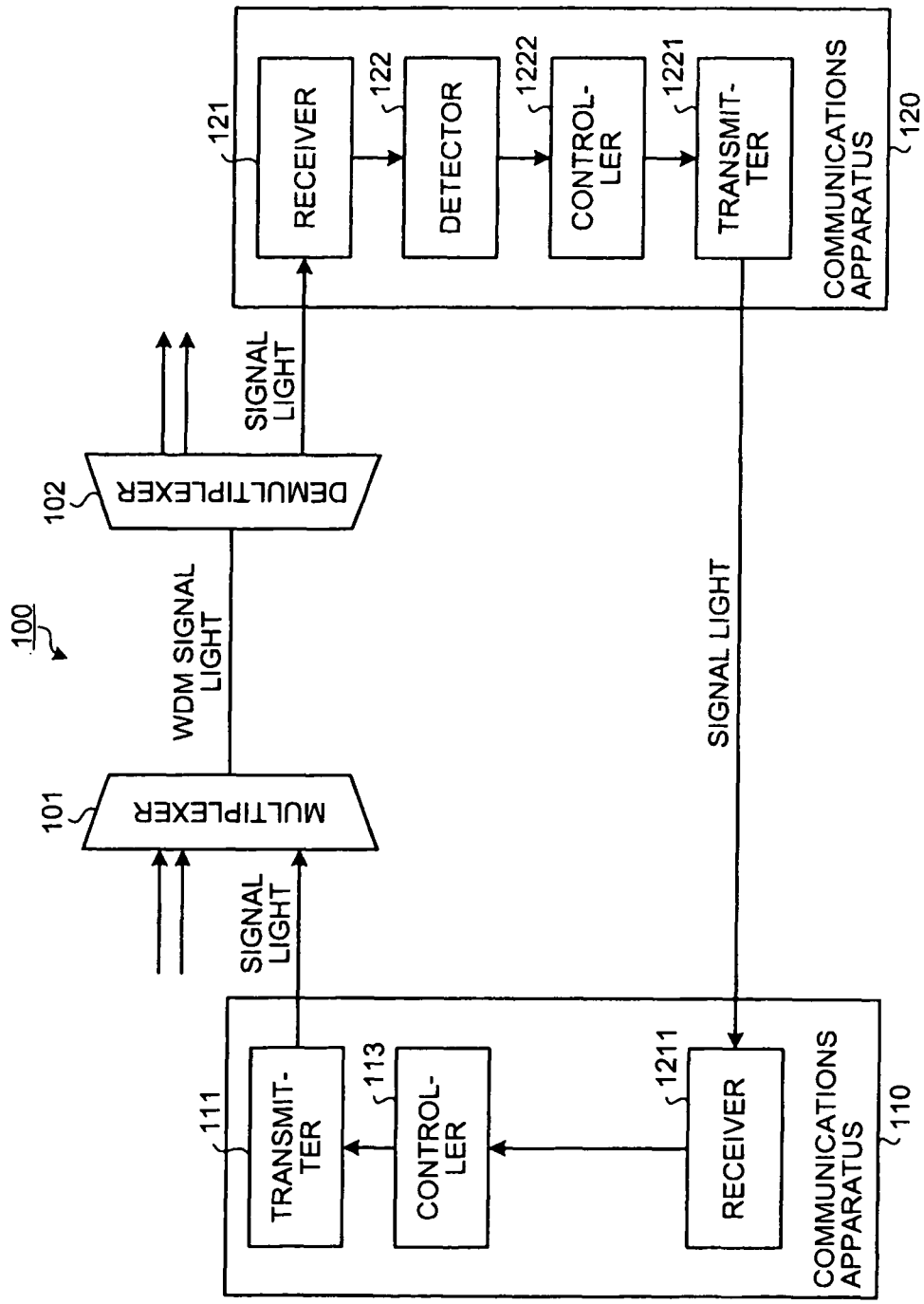
FIG. 12 is a diagram of the communications system according to a second embodiment.

FIG. 12 is a diagram of the communications system according to a second embodiment. In FIG. 12, components identical to those depicted in FIG. 1 are given the same reference numerals used in FIG. 1 and description thereof is omitted. As depicted in FIG. 12, the communications apparatus 110 according to the second embodiment includes a receiver 1211 in place of the receiver 112 depicted in FIG. 1. The receiver 1211 receives signal light output from the communications apparatus 120. The receiver 1211 outputs the received signal light to the controller 113. The controller 113 synchronizes the frequency of the signal light transmitted from the transmitter 111 with the frequency of the signal light output from the receiver 1211.

The communications apparatus 120 according to the second embodiment includes a transmitter 1221 and a controller 1222 in place of the transmitter 123 depicted in FIG. 1. The transmitter 1221 transmits signal light to the communications apparatus 110. The detector 122 outputs to the controller 1222, detection results concerning frequency variation. Based on the detection results output from the detector 122, the controller 1222 controls the frequency of the signal light to be transmitted from the transmitter 1221.

In this manner, the communications apparatus 120 changes the frequency of the signal light transmitted to the communications apparatus 110, based on the detection results concerning variation in the frequency of the signal light received from the communications apparatus 110. Meanwhile, by synchronizing the frequency of the signal light to be transmitted to the communications apparatus 120 with the signal light received from the communications apparatus 120, the communications apparatus 110 is able to change the frequency of the signal light, based on the detection results concerning the variation of the frequency of the signal light.

An exemplary communications system according to the second embodiment, is identical to the communications system 200 depicted in FIG. 2.

Figure 13:
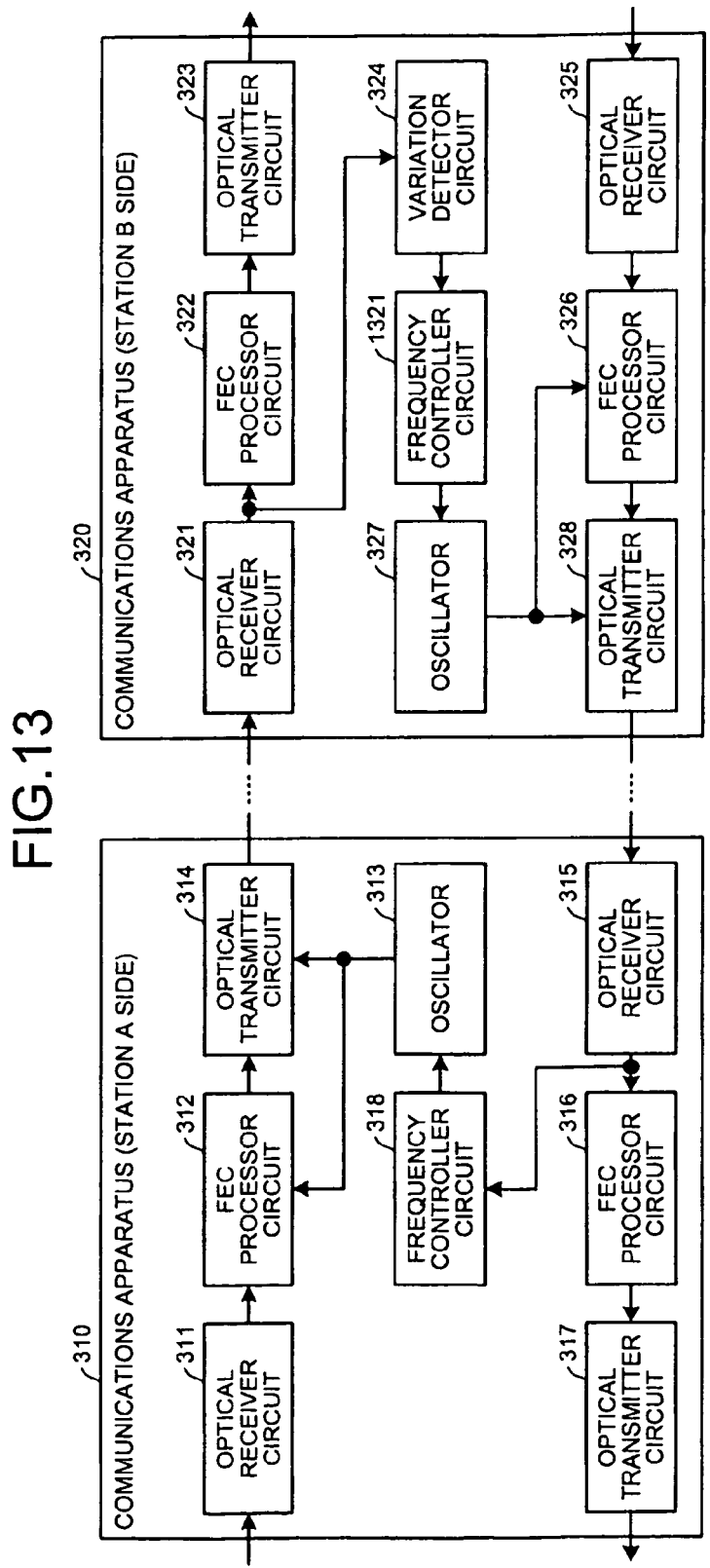
FIG. 13 is a diagram of an example of the communications apparatus.

FIG. 13 is a diagram of an example of the communications apparatus. In FIG. 13, components identical to those depicted in FIG. 3 are given the same reference numerals used in FIG. 3 and description thereof is omitted. The receiver 1211 depicted in FIG. 12, for example, can be implemented by the optical receiver circuit 315. As depicted in FIG. 13, the optical receiver circuit 315 of the communications apparatus 310 according to the second embodiment outputs to the FEC processor circuit 316 and the frequency controller circuit 318, the signal received from the communications apparatus 320.
(Communications Apparatus)

The frequency controller circuit 318 synchronizes the frequency of the clock signal output from the oscillator 313 with the frequency of the signal output from the optical receiver circuit 315. In this case, the oscillator 313 and the frequency controller circuit 318 can be implemented by a phase-locked loop (PLL) circuit, etc. Consequently, the frequency of the signal light that is transmitted by the optical transmitter circuit 314 can be synchronized with the frequency of the signal light received from the optical receiver circuit 315.

The communications apparatus 320 according to the second embodiment includes a frequency controller circuit 1321 in addition to the configuration depicted in FIG. 3. The transmitter 1221 depicted in FIG. 12, for example, can be implemented by the FEC processor circuit 326, the oscillator 327, and the optical transmitter circuit 328. The controller 1222 depicted in FIG. 12 can be implemented, for example, by the frequency controller circuit 1321, the oscillator 327, and the FEC processor circuit 326.

The variation detector circuit 324 outputs to the frequency controller circuit 1321, the detection results concerning frequency variation. Based on the detection results output from the variation detector circuit 324, the frequency controller circuit 1321 controls the frequency of the clock signal output by the oscillator 327. The frequency control that is based on the detection results and performed by the frequency controller circuit 1321 is identical to the frequency control that is based on the detection results concerning frequency variation and performed by the frequency controller circuit 318 according to the first embodiment.

The oscillator 327 outputs an oscillated clock signal to the FEC processor circuit 326 and the optical transmitter circuit 328. Further, under the control of the frequency controller circuit 1321, the oscillator 327 changes the frequency of the clock signal to be output. The oscillator 327, for example, can be implemented by a VCO.

The FEC processor circuit 326 adjusts the number of stuff bits stored to the FEC OH, according to the frequency of the clock signal output from the oscillator 327. The adjustment of the number of the stuff bits by the FEC processor circuit 326 is identical to the adjustment of the number of stuff bits performed by the FEC processor circuit 312 according to the first embodiment.

Consequently, based on the detection results concerning variation of the frequency of the signal light transmitted from the communications apparatus 310 to the communications apparatus 320, the communications apparatus 320 changes the frequency of the signal light transmitted from the communications apparatus 320 to the communications apparatus 310. Meanwhile, the communications apparatus 310 synchronizes the frequency of the signal light to be transmitted to the communications apparatus 320 with the frequency of the signal light transmitted from the communications apparatus 320. Consequently, based on the detection results concerning variation of the frequency of the signal light that has been transmitted to the communications apparatus 320, the communications apparatus 310 is able to change the frequency of the signal light that is transmitted to the communications apparatus 320.

Further, the communications apparatuses 310, 320 may have the respective functions of the other. For example, the communications apparatus 310 may detect variation of the frequency of the signal light received from the optical receiver circuit 315 and based on the detection results, change the frequency of the signal light transmitted from the optical transmitter circuit 314. The communications apparatus 320 may synchronize the frequency of the signal light transmitted from the optical transmitter circuit 328 with the frequency of the signal light received at the optical receiver circuit 321.

Therefore, the operation of the communications apparatus 310 and the operation of the communications apparatus 320 can be interchanged. For example, either of the communications apparatuses 310, 320 is set as a master apparatus while the other is set as a slave apparatus. Among the communications apparatuses 310, 320, the master apparatus is operated as the communications apparatus 320 depicted in FIG. 3 and the slave apparatus is operated as the communications apparatus 310 depicted in FIG. 3.

Examples of the optical receiver circuit 321 and the variation detector circuit 324 depicted in FIG. 13 are identical to the examples depicted in FIGS. 8 and 10. Furthermore, the communications apparatus 310 and the communications apparatus 320 depicted in FIG. 13 may be terminal communications apparatuses (see, for example, FIG. 4). Additionally, configuration may be such that variation of the frequency of received signal light is detected by detecting a slow variation of the quality of the received signal light (see, for example, FIG. 11).

Figure 14:
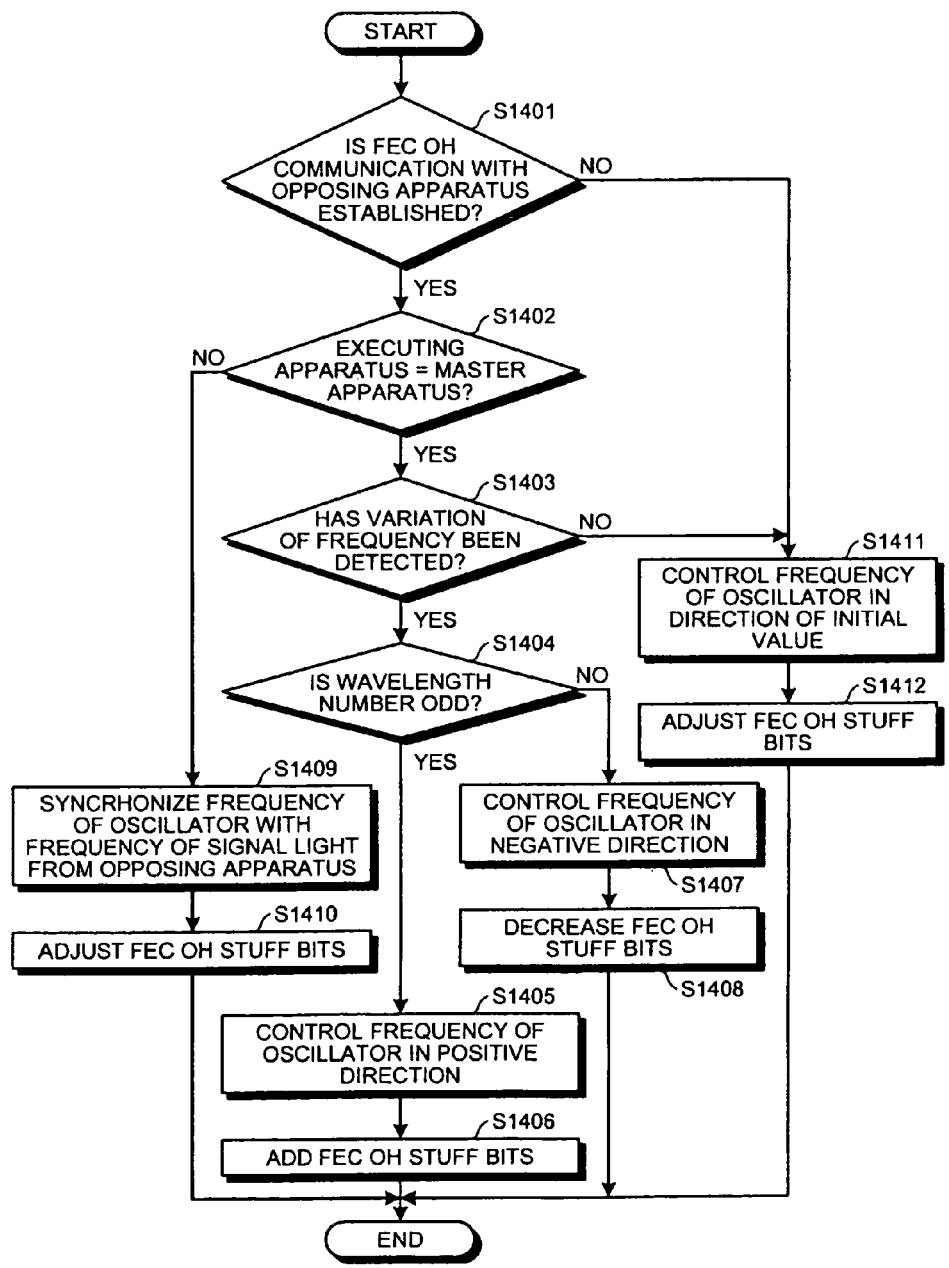
FIG. 14 is a flowchart of an example of processing by the communications apparatus.

FIG. 14 is a flowchart of an example of processing by the communications apparatus. The communications apparatus 310 or the communications apparatus 320 (hereinafter, executing apparatus), for example, repeatedly executes the steps depicted in FIG. 14. First, the executing apparatus determines whether FEC OH communication with the opposing apparatus has been established (step S1401). Here, if the executing apparatus is the communications apparatus 310, the opposing apparatus is the communications apparatus 320. If the executing apparatus is the communications apparatus 320, the opposing apparatus is the communications apparatus 310.

At step S1401, if FEC OH communication with the opposing apparatus is established (step S1401: YES), the executing apparatus determines whether the executing apparatus is the master apparatus (step S1402). If the executing apparatus is the master apparatus (step S1402: YES), the executing apparatus determines whether variation of the frequency (component slowly varying in strength) of the signal light received from the opposing apparatus has been detected (step S1403). If variation of the frequency has not been detected (step S1403: NO), the flow transitions to step S1411.

At step S1403, if variation of the frequency has been detected (step S1403: YES), the executing apparatus determines whether the wavelength number of the executing apparatus is an odd number (step S1404). If the wavelength number of the executing apparatus is an odd number (step S1404: YES), the executing apparatus controls the frequency of the oscillator in a positive direction (step S1405). Next, the executing apparatus adds FEC OH stuff bits, according to the controlled frequency at step S1405 (step S1406), ending a series of the operations.

At step S1404, if the wavelength number of the executing apparatus is not an odd number (step S1404: NO), the executing apparatus controls the frequency of the oscillator in a negative direction (step S1407). Subsequently, the executing apparatus decreases the FEC OH stuff bits, according to the controlled frequency at step S1407 (step S1408), ending a series of the operations.

At step S1402, if the executing apparatus is not the master apparatus (step S1402: NO), the executing apparatus synchronizes the frequency of the oscillator with the frequency of the signal light from the opposing apparatus (step S1409). Next, the executing apparatus increases or decreases the FEC OH stuff bits, according to the synchronized frequency at step S1409 (step S1410), ending a series of the operations.

At step S1409, if the frequency of the oscillator 327 has been controlled in a positive direction, FEC OH stuff bits are added at step S1410. At step S1409, if the frequency of the oscillator 327 has been controlled in a negative direction, FEC OH stuff bits are decreased at step S1410.

At step S1401, if FEC OH communication with the opposing apparatus is not established (step S1401: NO), the executing apparatus controls the frequency of the oscillator in a direction of an initial value (step S1411). Next, the executing apparatus increases or decreases the FEC OH stuff bits, according to the controlled frequency at step S1411 (step S1412), ending a series of the operations.

At step S1411, if the frequency of the oscillator is controlled in a positive direction, FEC OH stuff bits are added at step S1412. At step S1411, if the frequency of the oscillator is controlled in a negative direction, the FEC OH stuff bits are decreased at step S1412.

In the example depicted in FIG. 3, at step S1402, the communications apparatus 310 determines that the communications apparatus 310 is not the master apparatus and the communications apparatus 320 determines that the communications apparatus 320 is the master apparatus. In this case, the frequency controller circuits 1321 of communications apparatuses 320, which have adjacent wavelength channels, each change the frequency of the signal light to be mutually different, if an increase in frequency variation is detected. Consequently, control in which the frequency of signal light of adjacent wavelength channels is controlled in the same direction can be prevented, enabling differences in frequency to be surely induced among the beams of signal light of adjacent wavelength channels.

In this manner, according to the communications system 100 of the second embodiment, the frequency of the signal light transmitted by the communications apparatus 110 is changed based on detection results concerning variation of the frequency of the signal light transmitted by the communications apparatus 110, enabling differences in signal frequency to be induced among the beams of signal light of adjacent channels. For example, by synchronizing the frequency of the signal light, which is to be transmitted, with the signal light received from the communications apparatus 120, the communications apparatus 110 is able to change the frequency of the signal light, based on the detection results.

Consequently, even if the power, the wavelength interval, etc. of each beam of signal light that is wavelength division multiplexed changes, differences in (signal light) phase can be induced among adjacent channels and variations in frequency caused by cross modulation can be suppressed. Consequently, communication quality can be improved.

FIG. 15A is a diagram depicting the spectrum (weak nonlinear effect) of the signal light after transmission. FIG. 15B is a diagram depicting the spectrum (strong nonlinear effect) of the signal light after transmission. In FIGS. 15A and 15B, the horizontal axis represents wavelength [nm] and the vertical axis represents the power of the signal light [2 dB/Div].

FIGS. 15A and 15B depict detection results after transmission of the signal light, which has been RZ-DPSK modulated. Signal speed is assumed to be 10.71 [GHz] and the wavelength interval is assumed to be 25 [GH]. Spectrum 1501 in FIG. 15A is a spectrum of the signal light after transmission and when the nonlinear effect of the transmission path is relatively weak. Spectrum 1502 in FIG. 15B is a spectrum of the signal light after transmission and when the nonlinear effect of the transmission path is relatively strong.

The spectra 1501, 1502, respectively, are traces of superimposed spectra and the extent to which the wavelength (frequency) varies, blurring occurs along the direction of the horizontal axis. As depicted by the spectra 1501, 1502, if the nonlinear effect of the transmission path is relatively strong, the spectrum varies more along the direction of wavelength (frequency) than if the nonlinear effect of the transmission path is relatively small.

FIGS. 16A to 16F are diagrams depicting the spectra (after transmission) of the signal light differing in frequency between adjacent channels. Spectra 1601 to 1606 depicted in FIGS. 16A to 16F are the spectra of signal light that, under the same conditions as the spectrum 1502 depicted in FIG. 15, is caused to differ in frequency between adjacent channels.

Spectrum 1601 in FIG. 16A is that of signal light having a frequency difference of 0.01 [ppm] (110 [Hz]) between adjacent channels. Spectrum 1602 in FIG. 16B is that of signal light having a frequency difference of 0.1 [ppm] (1.1 [kHz]) between adjacent channels. Spectrum 1603 in FIG. 16C is that of signal light having a frequency difference of 0.2 [ppm] (2.2 [kHz]) between adjacent channels.

Spectrum 1604 in FIG. 16D is that of signal light having a frequency difference of 0.5 [ppm] (5.5 [kHz]) between adjacent channels. Spectrum 1605 in FIG. 16E is that of signal light having a frequency difference of 1 [ppm] (11 [kHz]) between adjacent channels. Spectrum 1606 in FIG. 16F is that of signal light having a frequency difference of 2 [ppm] (22 [kHz]) between adjacent channels.

As depicted by the spectrum 1502 in FIG. 15B and the spectrum 1601, with signal light differing in frequency by 0.01 [ppm] between channels, variation of the frequency of the signal light is suppressed as compared to signal light differing in frequency by 0 [ppm] between channels. Further, as depicted by the spectra 1601, 1602, with signal light differing in frequency by 0.1 [ppm] between channels, variation in the frequency of the signal light is suppressed as compared to signal light differing in frequency by 0.01 [ppm] between channels.

Further, as depicted by the spectra 1603 to 1606, with signal light differing in frequency by 0.2 [ppm] or more between channels, variation of the frequency is substantially suppressed entirely. In this manner, the greater the difference in the frequency of signal light of adjacent channels, the more variation of the frequency of the signal light can be suppressed.

Figure 17:
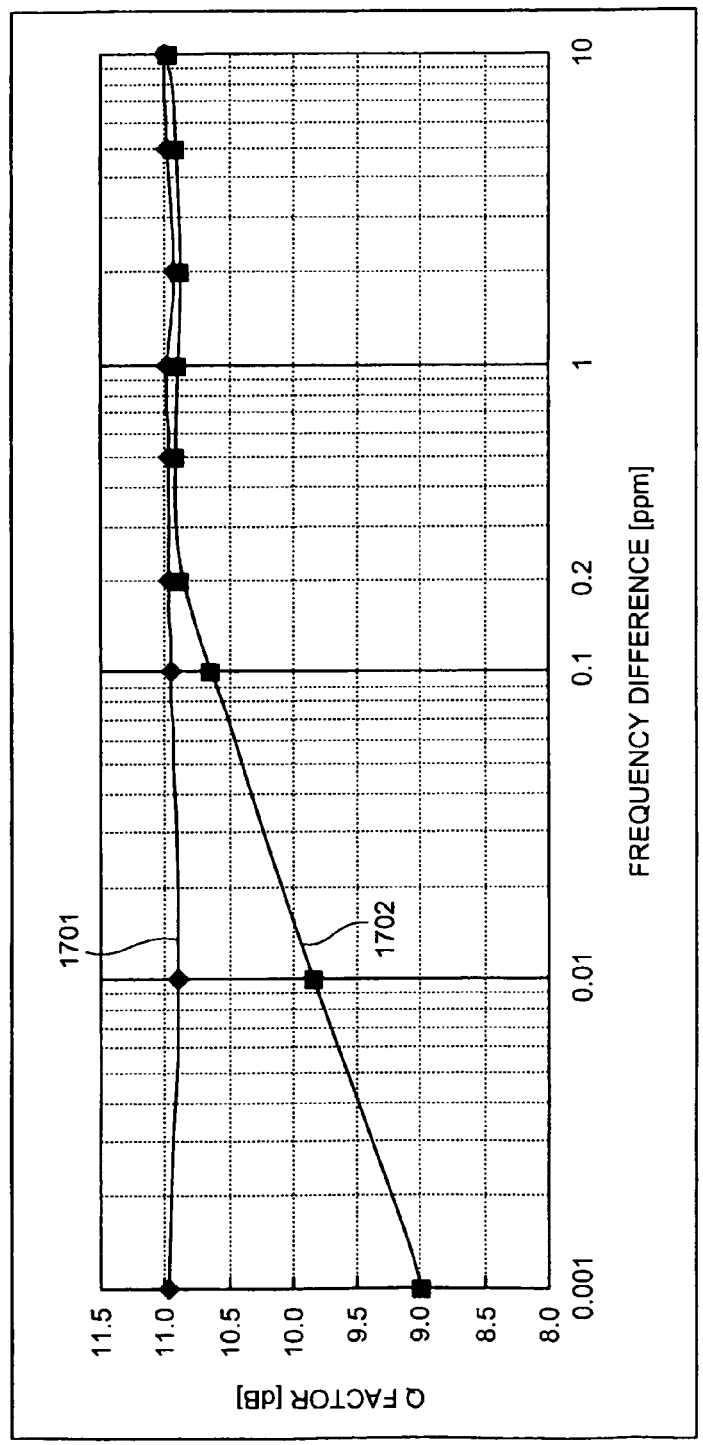
FIG. 17 is a graph depicting the relationship between the difference in the frequency of signal light of adjacent channels and the Q factor.

FIG. 17 is a graph depicting the relationship between the difference in the frequency of signal light of adjacent channels and the Q factor. In FIG. 17, the horizontal axis represents the difference in frequency [ppm] between adjacent channels; and the vertical axis represents the Q factor [dB] of the signal light after transmission. Q factor characteristic 1701 depicts the best Q factor level of the signal light versus the difference in frequency between adjacent channels. Q factor characteristic 1702 depicts the worst Q factor level of the signal light versus the difference in frequency between adjacent channels.

As depicted by the Q factor characteristic 1702, the greater the difference in the frequency between adjacent channels, the more the Q factor of the signal-light-after-transmission improves from the worst level. In particular, by making the difference in frequency between beams of signal light of adjacent channels 0.2 [ppm] or more, the Q factor of the signal light after transmission can be improved from the worst level to nearly the best Q factor level.

As described, according to the embodiments, based on the detection results (at the opposing apparatus) concerning variation of the frequency of the received signal light, the frequency of the signal light to be transmitted can be changed. Consequently, variation of the frequency of the signal light that differs in frequency between adjacent channels can be suppressed, enabling communication quality to be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communications apparatus comprising:
   a transmitter that transmits signal light that is wavelength division multiplexed with other signal light and that is to be transmitted to an opposing apparatus;
   a processor that is operative to change a bit rate of a signal to be transmitted by the transmitter based on a detection result, at the opposing apparatus, concerning variation in a frequency of a transmitted signal light; and
   a receiver that receives signal light transmitted by the opposing apparatus, a bit rate of a signal from the opposing apparatus being changed by the opposing apparatus, based on the detection result, wherein
   the processor is operative to synchronize the bit rate of the signal that is to be transmitted by the transmitter, with the bit rate of the signal received from the opposing apparatus.

2. The communications apparatus according to claim 1, further comprising a receiver that receives the detection result from the opposing apparatus, wherein
   the processor is operative to change the bit rate of the signal, based on the received detection result.

3. The communications apparatus according to claim 2, wherein the receiver receives the detection result stored in overhead of the signal from the opposing apparatus.

4. The communications apparatus according to claim 3, wherein the overhead is forward error correction overhead.

5. The communications apparatus according to claim 1, wherein the processor is operative to change the bit rate by changing an amount of stuff bits per unit time, included in the signal that is to be transmitted by the transmitter.

6. The communications apparatus according to claim 5, wherein the stuff bits are forward error correction stuff bits.

7. A multiplex communications apparatus comprising:
   the communications apparatus according to claim 1; and
   a multiplexer that multiplexes other light with the signal light transmitted by the communications apparatus.

8. The multiplex communications apparatus according to claim 7, further comprising
   a plurality of the communications apparatuses having mutually adjacent wavelength channels, wherein
   the multiplexer performs wavelength division multiplexing of the signal light transmitted by the communications apparatuses, and
   the processors of the communications apparatuses are operative to change the bit rates in mutually different directions.

9. A communications system comprising:
   a first communications apparatus that transmits phase modulated signal light;
   a second communications apparatus that receives signal light that is wavelength division multiplexed with other light and transmitted by the first communications apparatus, and that detects variation of a frequency of the received signal light, wherein
   the first communications apparatus
      receives signal light transmitted by the second communications apparatus, a bit rate of a signal from the second communications apparatus being changed by the second communications apparatus, based on the detected variation,
      changes, based on the detected variation by the second communications apparatus, a bit rate of a signal that is to be transmitted to the second communications apparatus, and
      synchronizes the bit rate of the signal that is to be transmitted to the second communications apparatus with the bit rate of the signal from the second communications apparatus; and
   the second communications apparatus
      changes, based on a detection result, a bit rate of the signal that is to be transmitted to the first communications apparatus.

10. The communications system according to claim 9, wherein
   the second communications apparatus transmits to the first communications apparatus, the detection result concerning variation of the frequency, and
   the first communications apparatus changes, based on the detection result transmitted by the second communications apparatus, the bit rate of the signal.

11. The communications system according to claim 9, wherein the second communications apparatus detects variation of the frequency by detecting a component of the signal light received from the first communications apparatus, the component varying in strength at a rate that is equal to or less than a given rate.

12. The communications system according to claim 9, wherein the second communications apparatus detects variation of the frequency by detecting variation of the quality of the signal light received from the first communications apparatus, the quality varying at a rate that is equal to or less than a given rate.

13. A communication method by a first communications apparatus that transmits phase modulated signal light and a second communications apparatus that receives signal light that is wavelength division multiplexed with other light and transmitted by the first communications apparatus, the communication method comprising:
- detecting, by the second communications apparatus, variation of a frequency of the signal light received from the first communications apparatus;
- receiving signal light transmitted by the second communications apparatus, a bit rate of a signal from the second communications apparatus being changed by the second communications apparatus, based on the detected variation;
- changing, by the first communications apparatus and based on the detected variation by the second communications apparatus, a bit rate of a signal that is to be transmitted to the second communications apparatus; and
- synchronizing the bit rate of the signal that is to be transmitted to the second communications apparatus with the bit rate of the signal from the second communications apparatus.

14. A communications apparatus, comprising:
- a transmitter that transmits signal light that is wavelength division multiplexed with other signal light and that is to be transmitted to an opposing apparatus;
- a processor that is operative to change a bit rate of a signal to be transmitted by the transmitter based on a detection result, at the opposing apparatus, concerning variation in a frequency of the transmitted signal light;
- a receiver that receives the detection result stored in overhead of a signal from the opposing apparatus, wherein
- the processor is operative to control a frequency of a clock signal output by an oscillator based on the detection result received by the receiver and
- the transmitter is operative to transmit a signal having a bit rate synchronized to the clock signal.

* * * * *